United States Patent
Guynn et al.

(10) Patent No.: US 9,238,591 B2
(45) Date of Patent: *Jan. 19, 2016

(54) PARTICLE PACKED CEMENT-SCM BLENDS

(71) Applicant: ROMAN CEMENT, LLC, Salt Lake City, UT (US)

(72) Inventors: John M. Guynn, Salt Lake City, UT (US); Andrew S. Hansen, Bountiful, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,869

(22) Filed: Jan. 22, 2015

(65) Prior Publication Data

US 2015/0144030 A1 May 28, 2015

Related U.S. Application Data

(63) Continuation of application No. 14/343,136, filed as application No. PCT/US2012/060640 on Oct. 17, 2012, now Pat. No. 8,974,593.

(60) Provisional application No. 61/549,742, filed on Oct. 20, 2011.

(51) Int. Cl.
*C04B 7/38* (2006.01)
*C04B 28/04* (2006.01)
(Continued)

(52) U.S. Cl.
CPC ... *C04B 7/34* (2013.01); *C04B 7/14* (2013.01); *C04B 7/26* (2013.01); *C04B 7/38* (2013.01);
(Continued)

(58) Field of Classification Search
CPC ...... C04B 20/008; C04B 7/38; C04B 20/026; C04B 28/04
See application file for complete search history.

(56) References Cited

U.S. PATENT DOCUMENTS

| 3,447,937 A | 6/1969 | Hersey et al. |
| 3,615,787 A | 10/1971 | Teramoto et al. |

(Continued)

FOREIGN PATENT DOCUMENTS

| CA | 2085219 | 10/2004 |
| CN | 101278245 | 10/2008 |

(Continued)

OTHER PUBLICATIONS

Celik, I.B., "The effects of particle size distribution and surface area upon cement strength development," Powder Technology 188 (2009) 272-276, Available online Aug. 8, 2008.

(Continued)

*Primary Examiner* — Paul Marcantoni
(74) *Attorney, Agent, or Firm* — Workman Nydegger

(57) ABSTRACT

Cement-SCM blends employ particle packing principles to increase particle packing density and reduce interstitial spacing between the cement and SCM particles. Particle packing reduces the amount of water required to obtain a cement paste having a desired flow, lowers the water-cementitious material ratio (w/cm), and increases early and long-term strengths. This may be accomplished by providing a hydraulic cement fraction having a narrow PSD and at least one SCM fraction having a mean particle size that differs from the mean particle size of the narrow PSD cement by a multiple of 3.0 or more to yield a cement-SCM blend having a particle packing density of at least 57.0%.

20 Claims, 11 Drawing Sheets

(51) Int. Cl.
*C04B 7/34* (2006.01)
*C04B 20/00* (2006.01)
*C04B 20/02* (2006.01)
*C04B 7/14* (2006.01)
*C04B 7/26* (2006.01)
*C04B 7/02* (2006.01)

(52) U.S. Cl.
CPC ............. *C04B 20/008* (2013.01); *C04B 20/026* (2013.01); *C04B 28/04* (2013.01); *C04B 7/02* (2013.01); *Y02W 30/92* (2015.05); *Y02W 30/94* (2015.05)

(56) References Cited

U.S. PATENT DOCUMENTS

| | | |
|---|---|---|
| 3,689,295 A | 9/1972 | Hersey et al. |
| 4,160,674 A | 7/1979 | Sawyer |
| 4,509,985 A | 4/1985 | Davidovits et al. |
| 4,640,715 A | 2/1987 | Heitzmann et al. |
| 4,642,137 A | 2/1987 | Heitzmann et al. |
| 4,842,649 A | 6/1989 | Heitzmann et al. |
| 4,997,484 A | 3/1991 | Gravitt et al. |
| 5,167,710 A | 12/1992 | Leroux et al. |
| 5,346,012 A | 9/1994 | Heathman et al. |
| 5,375,776 A | 12/1994 | Kupper et al. |
| 5,383,521 A | 1/1995 | Onan et al. |
| 5,417,760 A | 5/1995 | Folsberg |
| 5,525,155 A | 6/1996 | Allen |
| 5,527,387 A | 6/1996 | Andersen et al. |
| 5,531,823 A | 7/1996 | Breton |
| 5,650,004 A | 7/1997 | Yon |
| 5,651,505 A | 7/1997 | Lidstrom |
| 5,718,759 A | 2/1998 | Stav et al. |
| 5,804,175 A | 9/1998 | Ronin et al. |
| 5,951,279 A | 9/1999 | Hunold et al. |
| 6,027,561 A | 2/2000 | Gruber et al. |
| 6,030,447 A | 2/2000 | Naji et al. |
| 6,277,189 B1 | 8/2001 | Chugh |
| 6,444,026 B1 | 9/2002 | Steffler et al. |
| 6,641,658 B1 | 11/2003 | Dubey |
| 6,691,628 B2 | 2/2004 | Meyer et al. |
| 6,695,911 B2 | 2/2004 | Ramesohl et al. |
| 6,936,098 B2 | 8/2005 | Ronin |
| 7,172,814 B2 | 2/2007 | Hodson |
| 7,214,414 B2 | 5/2007 | Khemani et al. |
| 7,240,867 B2 | 7/2007 | Ronin |
| 7,296,994 B2 | 11/2007 | Meyer et al. |
| 7,347,896 B2 | 3/2008 | Harrison |
| 7,419,544 B2 | 9/2008 | Naji et al. |
| 7,442,248 B2 | 10/2008 | Timmons |
| 7,445,668 B2 | 11/2008 | Sommain |
| 7,799,128 B2 | 9/2010 | Guynn et al. |
| 7,972,432 B2 | 7/2011 | Guynn et al. |
| 8,043,425 B2 | 10/2011 | Garcia |
| 8,246,739 B2 | 8/2012 | Schwartzentruber et al. |
| 8,323,399 B2 | 12/2012 | Guynn et al. |
| 8,377,201 B2 | 2/2013 | Guynn |
| 8,414,700 B2 | 4/2013 | Guynn |
| 8,551,245 B2 | 10/2013 | Guynn et al. |
| 8,974,593 B2 | 3/2015 | Guynn et al. |
| 2001/0013302 A1 | 8/2001 | Mathur et al. |
| 2001/0020654 A1 | 9/2001 | Strasser et al. |
| 2003/0056935 A1 | 3/2003 | Meyer et al. |
| 2004/0035330 A1 | 2/2004 | Oates et al. |
| 2004/0089203 A1 | 5/2004 | Ronin |
| 2005/0000393 A1 | 1/2005 | Virtanen |
| 2005/0132933 A1 | 6/2005 | Blum |
| 2005/0204962 A1 | 9/2005 | Luke et al. |
| 2005/0252421 A1 | 11/2005 | Ronin |
| 2006/0201395 A1 | 9/2006 | Barger et al. |
| 2007/0095255 A1 | 5/2007 | Abbate et al. |
| 2007/0265783 A1 | 11/2007 | Mound |
| 2007/0266906 A1 | 11/2007 | Garcia |
| 2008/0178770 A1 | 7/2008 | Schumacher et al. |
| 2009/0020044 A1 | 1/2009 | Constantz et al. |
| 2009/0121052 A1 | 5/2009 | Ronin et al. |
| 2009/0305019 A1 | 12/2009 | Chanvillard et al. |
| 2010/0043673 A1 | 2/2010 | Batoz et al. |
| 2010/0089293 A1 | 4/2010 | Guynn et al. |
| 2010/0294171 A1 | 11/2010 | Schwartzentruber et al. |
| 2010/0313795 A1 | 12/2010 | Guynn et al. |
| 2010/0326326 A1 | 12/2010 | Rigaud et al. |
| 2011/0067601 A1 | 3/2011 | Fried |
| 2011/0259246 A1 | 10/2011 | Guynn et al. |
| 2012/0012034 A1 | 1/2012 | Guynn et al. |
| 2012/0024198 A1 | 2/2012 | Schwartzentruber et al. |
| 2012/0037045 A1 | 2/2012 | Fonollosa et al. |
| 2012/0085263 A1 | 4/2012 | Guynn et al. |
| 2012/0145046 A1 | 6/2012 | Hansen et al. |
| 2013/0192493 A1 | 8/2013 | Guynn et al. |
| 2014/0224154 A1 | 8/2014 | Guynn et al. |

FOREIGN PATENT DOCUMENTS

| | | |
|---|---|---|
| EP | 0088587 | 9/1983 |
| EP | 0263723 | 4/1988 |
| EP | 0611081 | 8/1994 |
| EP | 1413563 | 4/2004 |
| FR | 2943663 | 10/2010 |
| JP | 2002/068806 | 3/2002 |
| JP | 2002068806 | 3/2002 |
| JP | 2008184353 | 8/2008 |
| KR | 1019840001611 | 9/1984 |
| KR | 10-0183536 | 5/1999 |
| KR | 100183536 | 5/1999 |
| WO | WO9217415 | 10/1992 |
| WO | WO9746717 | 12/1997 |
| WO | WO0050362 | 8/2000 |
| WO | WO 01/23317 | 4/2001 |
| WO | WO0123317 | 4/2001 |
| WO | WO0216281 | 2/2002 |
| WO | WO2007053398 | 5/2007 |
| WO | WO2008069115 | 6/2008 |
| WO | WO2010109095 | 9/2010 |
| WO | WO2011103371 | 8/2011 |

OTHER PUBLICATIONS

"Composition of cement", www.engr.psu.edu/ce/courses/ce584/concrete/library/construction/curing/Composition_of_cement.htm, Feb. 18, 2014.

Concrete Batching, EPA, Jun. 2006, pp. 11.12-1-11.12-14.

Cros et al.: "Image Analysis of Fly Ash in the Characterization of the Shape of Grains," 1995 [Retrieved May 15, 2012]. Retrieved from http://journals.cambridge.org/download.php?file=%2FOPL%2FOPL370%2FS1946427400421858a.pdf&code=c5c0fad6487a292a968140bc4db80943.

"Effect of Cement Characteristics on Concrete Properties," Portland Cement Association, Oct. 26, 2007, http://web.archive.org/web/20071026182145/http://www.cement.org/tech/cct_cement_characteristics.asp.

"Fly Ash Increases Resistance to Sulphate Attack", QCL Group Technical Note, Aug. 1995, pp. 1-2.

"Fly Ash, Slag, Silica Fume, and Natural Pozzolans", Design and Control of Concrete Mixtures, EB001, Chapter 3, pp. 57-72.

Grzeszcyk et al, "Effect of Content and Particle Size Distribution of High-Calcium Fly Ash on the Rheological Properties of Cement Pastes", Cement and Concrete Research, vol. 27, No. 6, pp. 907-916, 1997.

Hasler, et al., "Particle Size Distribution of the Fly Ash From Biomass Combustion," Biomass for Energy and Industry, 10th European Conference and Technology Exhibition, Würzburg (Germany), Jun. 8-11, 1998.

Improved Cement Quality and Grinding Efficiency by Means of Closed Mill Circuit Modeling, A Dissertation by Gleb Gennadievich Mejeoumov, Submitted to the Office of Graduate Studies of Texas A&M University in partial fulfillment of the requirements for the degree of Doctor of Philosophy, Dec. 2007.

IPRP dated Apr. 12, 2011 from PCT App. Serial No. PCT/US2009/060194.

(56) References Cited

OTHER PUBLICATIONS

ISR and WO Opinion dated May 6, 2010 from PCT App. Serial No. PCT/US2009/060194.
Lee et al., "Effect of Particle Size Distribution of High Calcium Fly Ash on the Rheological Properties of fly ash-cement system on the fluidity of cement pastes," Cement and Concrete Research, 33 (2003), 763-768.
Slmetric, Retrieved May 15, 2012, Retrieved from http://www.simetric.co.uk/si_materials.htm.
Stutzman et al, "Composition Analysis of Beneficiated Fly Ashes", U.S. Department of Commerce, May 1995.
"Understanding Cement, Cement science made easier, Variability of cement", http://www.understanding-cement.com/variability.html, Jan. 10, 2009.
Wang, et al., "Comparison of Coal Ash Particle Size Distributions from Berner and Dekati Low Pressure Impactors," Armand Science & Technology, 41:1049-1062, 2007.
WiseGeek, "What is a Cement Silo?", http://www.wisegeek.com/what-is-a-cement-silo.htm.
U.S. Appl. No. 12/848,945, Mar. 3, 2011, Notice of Allowance.
U.S. Appl. No. 13/175,636, Apr. 30, 2012, Office Action.
U.S. Appl. No. 13/315,089, May 3, 2012, Office Action.
U.S. Appl. No. 13/175,636, Aug. 1, 2012, Notice of Allowance.
U.S. Appl. No. 13/183,205, Oct. 2, 2012, Final Office Action.
U.S. Appl. No. 13/315,089, Oct. 2, 2012, Final Office action.
U.S. Appl. No. 13/315,089, Nov. 6, 2012, Notice of Allowance.
U.S. Appl. No. 13/308,535, Jan. 13, 2013, Office Action.
U.S. Appl. No. 13/030,123, Mar. 26, 2013, Office Action.
U.S. Appl. No. 13/798,756, Jun. 4, 2013, Notice of Allowance.
U.S. Appl. No. 13/030,123, Sep. 12, 2013, Final Office Action.
U.S. Appl. No. 13/030,123, Dec. 5, 2013, Advisory Action.
U.S. Appl. No. 13/030,123, Feb. 24, 2014, Office Action.
U.S. Appl. No. 14/343,136, Mar. 6, 2014, Office Action.
U.S. Appl. No. 13/357,121, Apr. 4, 2014, Office Action.
U.S. Appl. No. 13/906,201, Jun. 4, 2014, Office Action.
U.S. Appl. No. 13/030,123, Aug. 27, 2014, Final Office Action.
U.S. Appl. No. 13/357,121, Sep. 22, 2014, Final Office Action.
U.S. Appl. No. 13/357,121, Nov. 6, 2014, Advisory Action.
U.S. Appl. No. 13/030,123, Nov. 19, 2014, Advisory Action.
U.S. Appl. No. 13/906,201, Jan. 2, 2015, Final Office Action.
U.S. Appl. No. 13/030,123, Feb. 26, 2015, Notice of Allowance.
U.S. Appl. No. 13/357,121, Feb. 26, 2015, Office Action.
U.S. Appl. No. 13/906,201, Mar. 30, 2015, Notice of Allowance.
"Improved Cement Quality and Grinding Efficiency by Means of Closed Mill Circuit Modeling," A Dissertation by Gleb Gennadievich Mejeoumov, Submitted to the Office of Graduate Studies of Texas A&M University in partial fulfillment of the requirements for the degree of Doctor of Philosophy, Dec. 2007.
"The Cement Sustainability Initiative—Climate Actions", World Business Council for Sustainable Development ("WBCSD"), Nov. 2008.
Durán-Herrera et al., "Synergetic effect of a Polycarboxylate Superplasticizer and a Fly Ash in the Production of a Concrete with conventional water/binder ratios"; Ninth ACI International Conference on Superplasticizers and Other Chemical Admixture Program, American Concrete Institute, Oct. 12, 2009.
Bentz, D., "Calorimetric Studies of Powder Additions to Mitigate Excessive Retardation in High Volume Fly Ash Mixtures", ACI Materials Journal pp. 1-20, Sep. 9, 2009.
Yilmaz, A., "Relationship Between Compressive and Chemical Compositions of Portland and Pozzolanic Cements", BAÜ Fen Bil. Enst. Dergisi, 5.2, pp. 4-13, 2003.
"Engineering news, opinion and product reports for engineers in process, design, electronics, energy and chemical engineering", Particle Size Analysis Reduces Cement Manufacturing Costs—Engineer Live, for Engine . . . http://www.engineerlive.com/Process-Engineer/Materials_Handling/Particle_size_analysis . . . , pp. 1-7, Oct. 26, 2009.
"Florida Rock slashes production costs using advanced process control and real-time particle size analysis", Real-time Particle Size Analysis—Forums, http://www.bulk-online.com/Forum/showthread.php?threadid=18052, (At least as early as Oct. 25, 2009).
Uzal et al., "High Volume Natural Pozzolan Concrete for Structural Applications", Business Publications, ACI Materials Journal, Sep./Oct. 2007.
Mehta, K., "High-Performance, High-Volume Fly Ash Concrete for Sustainable Development," Proceedings of the International Workshop on Sustainable Development & Concrete Technology, pp. 3-14; May 2004.
Thomas et al., "Use of ternary cementitious systems containing silica fume and fly ash concrete," Elsevier Science Ltd. Sep. 21, 1999.
"Cement Substitutes, By-Products from other manufacturing or electric generating processes can be substituted for cement", Toolbase Services, NAHB Research Center (At least as early as Jul. 14, 2009).
Bentz, D., "Replacement of "coarse" cement particles by inert fillers in low w/c ratio concretes II. Experimental validation", Cement and Concrete Research 35, pp. 185-188, Sep. 3, 2004.
Bentz, D., "Computer modeling of the replacement of 'coarse' cement particles by inert fillers in low w/c ratio concretes Hydration and strength", Cement and Concrete Research 31, pp. 503-506, Jan. 5, 2001.
Bentz et al., "Effects of cement particle size distribution on performance properties of Portland cement-based materials", Cement and Concrete Research 29, pp. 1663-1671, Jul. 14, 1999.
"Roman Concrete", Wikipedia, http://en.wikipedia.org/wiki/Roman_cement, Jan. 10, 2009.
Moore, D., "The Riddle of Ancient Roman Concrete", www.romanconcrete.com/docs/spillway/'spillway.htm., Feb. 1993.
"Cement", Wikipedia, http://en.wikipedia.org/wiki/Hydraulic_cement, Sep. 5, 2008.
Middendorf et al., "Lime Pozzolan Binders: An Alternative to OPC?*", International Building Lime Symposium 2005, Orlando, Florida, pp. 1-13, Mar. 9-11, 2005.
Pure Natural Pozzolan Cement, Azmar International, Inc., pp. 1-11 (at least as early as Jul. 2008).
"Fly ash", Wikipedia, http://en.wikipedia.org/wiki/Fly_ash, Jan. 10, 2009.
"Cement Types," Ceratech, www.ceratechinc.com/cement.asp, Sep. 5, 2008.
"Pozzolan," Wikipedia, http://en.wikipedia.org/wiki/Pozzolan, Jan. 10, 2009.
"Pozzolete, a natural resource," Natural Pozzolan of Nevada, http://www.naturalpozzolan.com/pozzolete/index.html, Dec. 17, 2008.
"About Pozzolans, Pozzolans General Description," Vitro Minerals, http://www.vitrominerals.com/printable%20pages/tech-infor.htm, Dec. 17, 2008.
"CT-Microcem Ultra Fine Cement", Finland CT (at least as early as Jan. 2009).
Barger, GS, "Production and Use of Calcined Natural Pozzolans in Concrete," Journal of Cement, Concrete and Aggregates, vol. 23, Issue 2, Dec. 2001.
"Fly Ash," U.S. Department of Transportation, Infrastructure Materials Group, http://fhwa.dot.gov/infrastructure/materialsgrp/flyash.htm, Jan. 10, 2009.
Gibbons, P., Pozzolans for Lime Mortars, The Building Conservation Directory 1997, http://www.buildingconvservation.com/articles/lime/pozzo.htm, pp. 1-5, Sep. 5, 2008.
Osbaeck, B. and Johansen, V., "Particle Size Distribution and Rate of Strength Development of Portland Cement," J. Am. Ceram. Soc., 72 (2) pp. 197-201, Feb. 1989.
Horst, Scot, "Some Basics About Substituting Pozzolans for Portland Cement in Concrete," as taken from presentation handout with author's permission, USGBC Member Summit, Tucson, AZ, pp. 1-7, Aug. 2001.
"Blender dedusts fly ash with minimal moisture to cut transport costs," Case History, Powder and Bulk Engineering, www.powderbulk.com, Jul. 2001.
Shah, Surendra P. and Wang, Kejin, "Development of "Green" Cement for Sustainable Concrete Using Cement Kiln Dust and Fly Ash," Dept. of Civil Engineering, Northwestern University, Evanston, IL USA and Dept. of Civil Engineering Iowa State University, Ames IA USA, pp. 15-23 (at least as early as Feb. 2009).

(56) References Cited

OTHER PUBLICATIONS

Technical Evaluation of Energetically Modified Cement, ISG Resources Inc., pp. 1-4, Aug. 2001.
Bentz, Dale, "Considerations of Designing High Volume Fly Ash Mixtures," ACI 2009 Spring Convention, Research in Progress, Powerpoint Presentation, pp. 1-5, presented Mar. 16, 2009.
Malvern, "Inform-Reducing the Cost of Cement Production Benefits to Vulcan Materials Decision to Upgrade its Finishing Circuit from Manual to Automated Process Monitoring and Control," World Cement, Jul. 2009.
Basalite Concrete Products, "Microcem-Microfine Cement," (at least as early as Jun. 2006).
Andersen, P., "Control and Monitoring of Concrete Production..a Study of Particle Packing and Rheology", The Danish Academy of Technical Sciences, 1990.
Durán-Herrera et al., "Evaluation of Sustainable High-Volume Fly-Ash Concretes", National Institute of Standards and Technology, (2009).
Bentz, D., "Limestone Fillers Conserve Cement, Part 1: An analysis based on Powders' model", Concrete International, pp. 41-46, Nov. 2009.
Bentz et al., "Mixture Proportioning Options for Improving High Volume Fly Ash Concretes", at least as early as Feb. 19, 2010 at http://concrete.nist.gov/bentz.
International Search Report and Opinion dated May 13, 2009 from PCT Application Serial No. PCT/US2009/060194.
International Preliminary Report on Patentability dated Nov. 30, 2009 from PCT Application Serial No. PCT/GB2008/003739.
Cross et al., "Evaluation of the Durability of 100 Percent Fly Ash Concrete," Western Transportation Institute, Final Report Nov. 2006 through Jun. 2008, 45 pages.
Hwang et al., "Rheological behavior of a slag cement paste prepared by adjusting the particle size distribution", Journal of Ceramic Processing Research, vol. 10, No. 4, pp. 409-413, (2009).
Zhang et al., A new gap-graded particle size distribution and resulting consequences on properties of blended cement (Accepted Manuscript) (Accepted Date: Feb. 24, 2011).
OK Vertical Roller Miller, Product brochure published by FLSmidth (2010).
Wang et al., The Application and Development of Fly Ash in China, 2007 World of Coal Ash (WOCA), May 7-10, 2007, Northern Kentucky, USA.
Harbour et al., Characterization of Slag, Fly Ash and Portland Cement for Saltstone (Feb. 2006).
Gurney et al., Using Limestone to Reduce Set Retardation in High Volume Fly Ash Mixtures: Improving Constructability for Sustainability, National Institute of Standards and Technology (Submission Date: Aug. 1, 2011).
Van Oss, Background Facts and Issues Concerning Cement and Cement Data, USGS (2005).
De Weerdt et al., Synergy between fly ash and limestone powder in ternary cements, Cement & Concrete Composites (Accepted Sep. 7, 2010).
Sato et al., Effect of nano-$CaCO_3$ on hydration of cement containing supplementary cementitious materials, Advances in Cement Research, 23, (1), pp. 1-29, Oct. 2010.
De Weerdt et al., Hydration mechanisms of ternary Portland cements containing limestone powder and fly ash, Cement & Concrete Research (Accepted Nov. 19, 2010).
Zhang et al., "A new gap-graded particle size distribution and resulting consequences on properties of blended cement," Cement & Concrete Composites 33 (2011) 543-550 (Available online Mar. 1, 2011).
Zhang et al., "Study on optimization of hydration process of blended cement," J. Therm. Anal. Calorim. DOI 10.1007/s10973-011-1531-8 (Published online: Apr. 8, 2011).
Vogt, Carsten, "Ultrafine particles in concrete: Influence of ultrafine particles on concrete properties and application to concrete mix design," Doctoral Thesis, School of Architecture and the Build Environment, Division of Concrete Structures, Royal Institute of Technology, Sweden, TRITA-BKN. Bullentin 103, 2010.
Fennis, et al., "The use of particle packing models to design ecological concrete," Heron vol. 54, No. 2/3 (2009).
Bentz et al., "Optimization of Particle Sizes in High Volume Fly Ash Blended Cements," NISTIR (Feb. 2011).
D. Bentz, A. Hansen, J. Guynn, "Optimization of cement and fly ash particle sizes to produce sustainable concretes," Cement & Concrete Composites 33 (2011) 824-831 (Available online May 7, 2011).
Bentz, et al., "Influence of Particle Size Distributions on Yield Stress and Viscosity of Cement-Fly Ash Pastes," (Accepted for Publication in Cement & Concrete Composites Nov. 2011).
Zhang, et al., "Effects of size fraction on composition and fundamental properties of Portland cement," Construction and Building Materials 25 (Feb. 2011) 3038-3043.
Zhang, et al., "Investigation on mechanical properties, durability and micro-structural development of steel slag blended cements," J. Therm. Anal. Calorim DOI 10.1007/S10973-011-1853-6 (Aug. 2011).
Zhang, et al., "A gap-graded particle size distribution for blended cements: Analytical approach and experimental validation," Powder Technology 214 (Aug. 2011) 259-268.
Zhang, et al., "Efficient utilization of cementitious materials to produce sustainable blended cement," Cement & Concrete Composites 34 (Feb. 2012) 692-699.
Zhang, et al., "Influence of preparation method on the performance of ternary blended cements," Cement & Concrete Composites 52 (May 2014) 18-26.
U.S. Appl. No. 12/576,117, Jul. 22, 2010, Notice of Allowance.
U.S. Appl. No. 12/848,945, Oct. 15, 2010, Office Action.
U.S. Appl. No. 12/848,945, Dec. 28, 2010, Office Action.
U.S. Appl. No. 13/183,205, Mar. 19, 2012, Restriction Requirement.
U.S. Appl. No. 13/183,205, May 3, 2012, Office Action.
U.S. Appl. No. 13/183,205, Dec. 6, 2012, Notice of Allowance.
European Search Report for European App. No. EP12841852 dated Aug. 4, 2015.
Chinese Office Action for Chinese App. No. 201280063750.2 dated Jun. 2, 2015.
Columbian Office Action for Columbian App. No. 14-72033 dated Jul. 28, 2015.
Zhou et al., Research on Powder Degree Distribution on Influencing the Physical Characteristics of Compound Cement.

PARTICLE PACKED CEMENT-SCM BLENDS

CROSS REFERENCE TO RELATED APPLICATIONS

This application is a continuation of U.S. patent application Ser. No. 14/343,136, Mar. 6, 2014, which is a 371 application based on International Patent Application No. PCT/US2012/060640, filed Oct. 17, 2012, which claims the benefit of U.S. Provisional Application No. 61/549,742, filed Oct. 20, 2011.

BACKGROUND OF THE INVENTION

1. Field of the Invention

The invention is generally in the field of hydraulic cement and concrete.

2. Relevant Technology

Supplementary Cementitious Materials ("SCMs"), such as fly ash, slag, natural pozzolans, and limestone, are often used to replace a portion of Portland cement in concrete. SCMs can yield improved concrete with higher durability, lower chloride permeability, reduced creep, increased resistance to chemical attack, lower cost, and reduced environmental impact. Pozzolans react with calcium hydroxide released during cement hydration. Limestone can provide a filler effect and nucleation sites.

Portland cement, sometimes referred to as "cement clinker" or "OPC" (acronym for "ordinary Portland cement"), is the most expensive component of concrete. The manufacture of cement clinker contributes an estimated 5-7% of all manmade $CO_2$. There is a long-felt but unmet need to reduce cement clinker ("clinker") consumption. There have been numerous academic conferences and publications dedicated to the concept of substituting a portion of clinker with SCM. Despite an oversupply of low cost SCMs, the industry has failed to overcome technical hurdles to more effectively utilize SCMs. This failure, after years of research and discussion, to fully utilize readily available and less expensive SCMs to reduce clinker consumption, even though doing so would reduce cost and benefit the environment, means that conventional practices for utilizing SCMs are inadequate. Hundreds of millions of tons of waste SCMs such as fly ash and steel slag continue to be discarded into the environment worldwide each year at a cost to the producer and even greater cost to the environment.

SCMs are typically waste products not purposely produced for blending with OPC. Because OPC and SCMs are often produced for different reasons by different industries, OPC manufacturers have little or no influence on SCM production and SCM producers have little or no influence on OPC manufacture. The result is that cement manufacturers continue to produce and optimize OPC for use with itself without regard to how OPC behaves when substituted with SCMs.

Cement manufacturers deliberately produce OPC having a broad particle size distribution ("PSD") (e.g., between about 1-60 μm) in an attempt to strike a balance between the competing effects and demands of reactivity, rate of strength development, water demand, inter particle spacing, paste density, porosity, autogenous shrinkage, and grinding cost. PSD and chemistry are selected to optimize use of OPC by itself. SCM substitution is secondary and has little or no influence on how cement is manufactured. Slightly raising Blaine fineness when intergrinding clinker and SCM to offset retardation is the only commercial attempt to "optimize" cement for SCM substitution.

SCMs are usually less reactive than clinker and retard strength development by dilution. Although some OPC-SMC blends can approach the strength of OPC at later ages (>56 days), early (1-28 day) strength can be severely impacted when more than about 10-20% of OPC is replaced with SCM. Early strength loss and/or delayed set times limit SCM usage in concrete. The conventional solution is to "fix" the SCMs to make them more reactive, e.g., by grinding them more finely, either independently or by intergrinding with clinker. Neither solution has solved problems of SCM underutilization. Meanwhile, waste SCMs continue to accumulate worldwide in alarming quantities, and the disconnect between OPC production and effective SCM utilization persists.

BRIEF SUMMARY OF DISCLOSED EMBODIMENTS

Hydraulic cements and SCMs are optimized for use with each other. In one aspect, cement-SCM blends can employ particle packing principles to increase particle packing density ("PPD") and reduce interstitial spacing between the particles. Producing cement and SCM fractions that are particle packed reduces the amount of water required to obtain a cement paste having a desired flow, lowers the "water-to-total cementitious material ratio" (w/cm), and increases early and long-term strengths. Particle packed cement-SCM blends increase paste density and decrease water demand compared to OPC by itself and conventional cement-SCM blends, particularly interground materials having a higher Blaine than OPC.

High particle packing density can be accomplished by optimizing the respective PSDs of the cement and SCM fractions to reduce interstitial void spaces. Independently processing the cement and SCM fractions, while optimizing them for blending with each other, also permits selection of PSDs and/or chemistries to optimize the individual contributions of each component and/or the overall synergy of the blend.

According to one embodiment, a hydraulic cement fraction having a narrow PSD and at least one SCM fraction having a mean particle size that differs from the mean particle size of the narrow PSD cement by a multiple of 3.0 or more provide a cement-SCM blend having a particle packing density of at least 57.0%.

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1A:
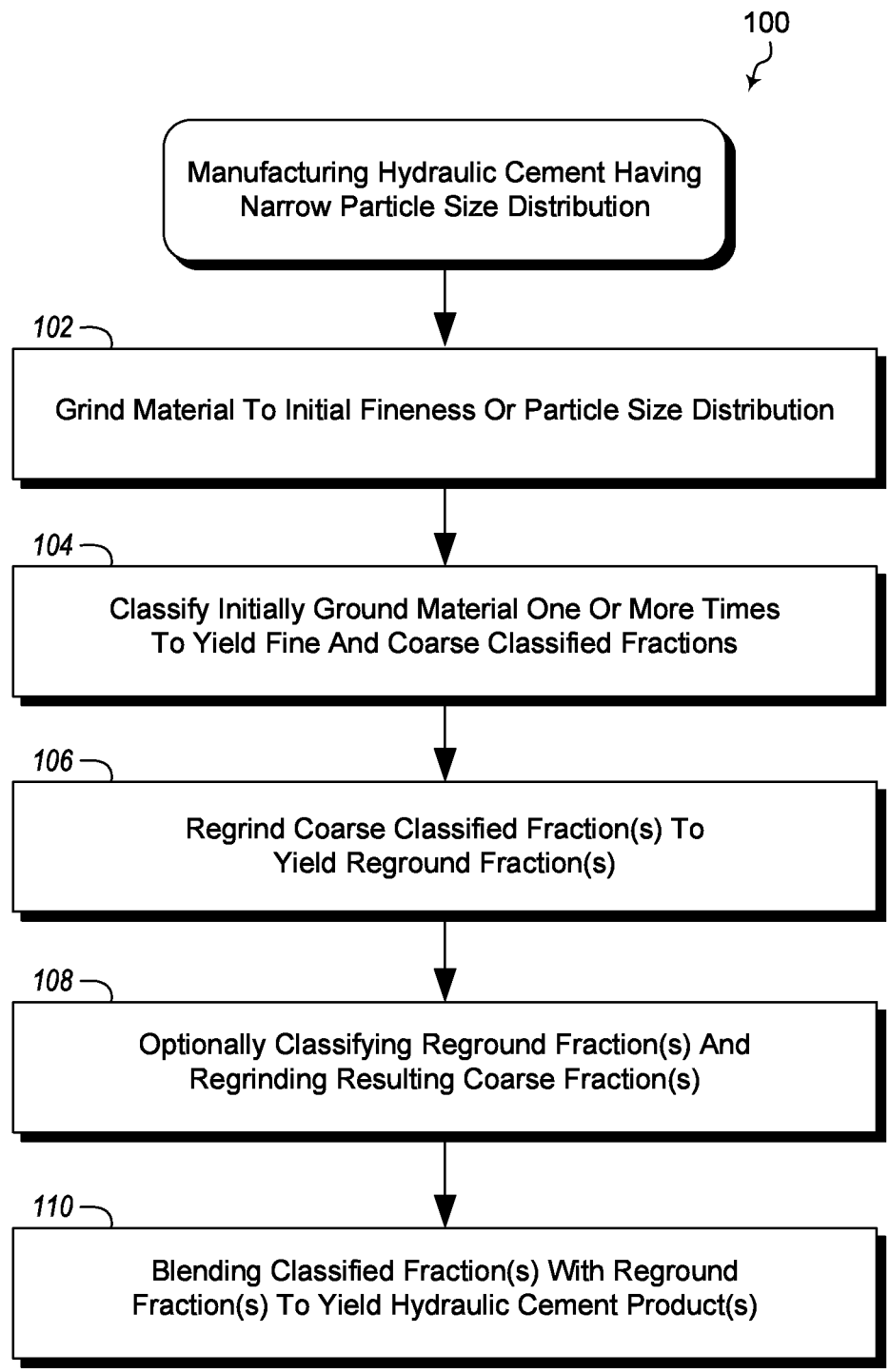
FIGS. 1A-1B are schematic flow diagrams of exemplary methods of manufacturing hydraulic cement having a desired PSD and cement-SCM blends.

Cement-SCM blends include cement and SCM fractions that are optimized for high particle packing density ("PPD") of cement paste (e.g., within mortar or concrete) during early stages when good flow characteristics are desired. High PPD blends optimize the strength-imparting properties of the cement fraction, improve the space-filling capacity of the SCM fraction(s), and, in many cases, derive additional long-term strength from at least a portion of the SCM fraction(s).

The concept of "particle packing" using well-graded aggregates to increase aggregate packing density has been used to great advantage in concrete to reduce the amount of cement paste required to yield concrete having a desired strength. By way of illustration, a single aggregate concrete sand mix might include sand with a natural PPD of 55%. Thus, the bulk volume of sand includes 45% empty void spaces between the particles. As a result, the sand mix contains at least 45% by volume of cement paste. In this hypothetical, simply using a second aggregate of different average particle size, such as pea gravel or rock, can increase the particle packing density of the aggregate fraction from 55% to 70-85%, which substantially decreases the amount of cement paste required to yield concrete of the same strength. Adding a third aggregate can further increase aggregate packing density and reduce cement paste volume. The use of well graded aggregates selected to optimize aggregate packing density can be used to engineer high strength concrete with optimized cement paste volume.

Similar particle packing concepts have not been used in OPC or cement-SCM blends, where either a broad particle size distribution (e.g., Fuller distribution) or a narrower distribution (e.g., as advocated by Tsivilis) continue to be used. In practical terms, the only way to produce OPC with high PPD using conventional methods is to flatten the PSD curve and extend the endpoints (e.g., lower the d10 and/or raise the d90). However, simply lowering the d10 below what has been found to be optimal increases grinding costs without a corresponding benefit. For example, cement particles below a certain size (e.g., 0.5-1.5 μm) dissolve almost immediately when mixed with water. Increasing the amount of cement particles that quickly dissolve in water does not increase the PPD of the remaining cement particles. On the other hand, increasing the d90 of the cement particles may, in fact, increase the PPD of cement particles in the cement paste. But the net effect may be to reduce overall surface area and reactivity of the cement, which reduces the rate of strength development and increases the number of large cement particles that cannot fully hydrate but remain an expensive filler.

In view of the foregoing constraints, a typical practice is to grind Types I, II and V cements so as to have a d10 of about 1-2 μm and a d90 of about 35-45 μm. Florida Rock reported that cement grinding can be optimized to reduce grinding cost and increase cement strength by providing OPC in which 70% by volume of the cement particles have particle sizes spanning the range of 2-32 μm. In general, narrowing (or steepening) the PSD curve of OPC provides certain known benefits and detriments. Grinding costs can be reduced and cement reactivity can increase, but so can water demand and bleeding of the cement paste. For example, grinding costs are reduced but bleeding increases when fewer cement fines are produced. Cement reactivity increases when there are fewer coarse particles, but the reduced PPD of narrower PSD cements increases water demand. Because of known problems associated with narrow PSD cements, vertical roller mills and high pressure grinding rolls, which are naturally able to produce cements with a narrower PSD than ball mills, have been deliberately modified to broaden cement PSD (e.g., by increasing the number of times the cement particles are delivered to the grinding bed before they are finally removed as finished product by the classifier).

In summary, and in view of longstanding experience and practice, the PSD of OPC is deliberately maintained by essentially all cement manufacturers within specified d10 and d90 limits with little or no deviation in order to strike a desired balance between the competing effects and demands of reactivity, rate of strength development, water demand, inter particle spacing, paste density, porosity, autogenous shrinkage, and grinding cost. This practice makes perfect sense when considering how OPC behaves by itself. It is irrational in the context of SCM usage because it fails to consider how deficiencies of narrow PSD cements can be mitigated, or used advantageously, by blending such cements with complementary sized SCM particles. Thus, the thinking that drives "optimization" by industry practice is the main impediment that prevents OPC from being optimized for use with SCMs. Such thinking has prevented cement experts from even attempting to produce highly particle packed cements—there has been no purpose or technical path to achieving such a result.

As a result, the PPD of OPC is rarely, if ever, measured, much less reported. Nevertheless, recent papers by Zhang et al. (discussed below) have identified commercial OPCs with particle packing densities of less than about 50% (i.e., the bulk volume of OPC is more than 50% void space). Thus, the volume of water required to initially fill void spaces between cement particles and displace air during initial mixing is greater than the volume of the cement itself. Even before accounting for whatever additional "mix water" is required to wet the aggregates and provide sufficient excess water in the cement paste to provide desired mortar spread and/or concrete slump, the first water that must be added to OPC is essentially "wasted" water that does not contribute to paste and concrete flowability. It is the "excess" water beyond such "space filling" (or interstitial) water that contributes most to providing desired flow.

The high void space between cement particles in OPC can be analogized to the high void space between sand particles in a single aggregate sand mix (except that the particle packing density of OPC may be even worse). It would be wasteful to produce concrete with only sand as the aggregate, rather than sand and rock, because it can more than double the amount of cement required to yield concrete with the same strength. It also yields concrete more likely to shrink and develop cracks, initially and over time.

Similarly, using OPC that has a PPD of 50% or less is "wasteful". Such waste is not because "space filling" water is expensive (water is less expensive than cement, except when considering the cost of water reducing admixtures). It is because space filling water detrimentally reduces cement paste strength by unnecessarily increasing the "water-to-cement ratio" (w/c) ratio of the cement paste as compared to a hypothetical cement having higher PPD and a lower volume of void spaces that must be filled with space filling water. By way of illustration, a hypothetical cement with a PPD of 75% would include half the void space of a cement with a PPD of 50%. This would reduce by half the amount of "space filling" water required to displace air and fill the interstitial voids during initial mixing. The other half of the "space filling" water otherwise required for OPC wetting would then be freed up as "mix water" (or "water of convenience") available for providing desired flow of the cement paste and concrete. The result would be a substantial reduction in total water required to yield cement paste and concrete having the desired flow. This, in turn, would substantially reduce the w/cm and increase strength for a given flow. Because the effect of w/cm on strength is not linear, a given percent reduction in w/cm typically increases strength by a substantially larger amount. And because w/cm accounts for both higher reacting hydraulic cement and less reactive SCM fractions, it is possible that changes in w/cm may have a more dramatic effect on strength (by exaggerating the decrease in net w/c).

In contrast to conventional cements, engineered cements as disclosed herein utilize principles of particle packing similar to those used in concrete aggregate packing to increase the PPD of solid particles in cement paste. The engineered cements contain cement and SCM fractions with complementary particle sizes that increase overall PPD compared to each fraction by itself. The cement and SCM fractions can be particle size optimized to provide their highest respective benefit to the overall blend. The chemistries of the cement and SCM fractions can also be optimized to further enhance SCM replacement and/or provide other desired properties.

According to one embodiment, a particle packed engineered cement is obtained by "replacing" at least some of the ultrafine dissolving cement particles in OPC with ultrafine non-dissolving (or more slowly dissolving) SCM particles that fill in fine pore spaces with solid particles. The ultrafine SCM particles displace water and/or dissolved cement minerals that would otherwise be required to fill pore spaces between larger cement particles when preparing fresh cement paste having a desired flow. At least some of the coarse cement particles can be "replaced" with similarly sized, or even larger sized, coarse SCM particles, which can reduce or eliminate unhydrated cement cores in hardened concrete. Coarse SCM particles are generally less expensive than coarse cement particles and can be graded more coarsely to further enhance PPD and reduce the amount of water and/or dissolved cement minerals that would otherwise be required to fill inter particle spaces when creating fresh cement paste having a desired flow. For example, engineered cements can include ultra-coarse SCM particles graded so as to enhance their particle packing effect relative to the finest aggregate fraction in concrete or mortar. In this way, the entire aggregate-cement-SCM system can be more properly particle packed compared to conventional concrete and mortar.

II. Particle Size, Particle Packing Density, Hydration, Water Demand, and Strength Development A. Background Principles Water is both a reactant for cement hydration and causes cementitious materials to flow and consolidate. As long as a cementitious material has sufficient water so that it can be placed and shaped as desired and become properly consolidated, it will typically also have sufficient water to cause the cementitious binders to hydrate and develop strength. This is true for hydraulic cements and pozzolans alike. All things being equal, lowering the w/cm improves both early and later strengths.

In order for principles of particle packing of cement-SCM blends to be effective, it is advantageous to consider both short-term and long-term dynamics of the cement and SCM particles and select cement and SCM fractions accordingly. It is not enough to select particles that provide a high degree of initial particle packing (i.e., when water is first added). One should also consider how the particles behave over time, e.g., during some or all of the following exemplary stages: 1) mixing with water to form fresh concrete or other cementitious material, 2) storage and/or transport before use, 3) placement, consolidation, shaping, and/or surface finishing, 4) initial and/or final set, and 5) early and/or long-term strength development.

Cement particles are much more reactive than SCM particles and change in size more rapidly than SCM particles as a function of time, both in early stages before setting and in later states after setting. Short-term changes in particle size (e.g., shrinkage by dissolution) after mixing with water, during storage and/or shipping, and during placement, consolidation and/or finishing can dramatically affect PPD, rheology, and flow characteristics of cement paste. After setting, however, rheological effects of changing particle size and PPD become far less relevant, if not irrelevant.

Hydraulic cements such as Portland cement are generally more reactive than SCMs and can beneficially provide high early strength, heat and excess lime required for pozzolanic reactions. For this reason, hydraulic cement particles dissolve more rapidly than SCMs and generally experience greater particle size reduction compared to SCM particles, especially in early stages before setting when flow is most affected. It is advantageous to account for short-term dissolution effects on hydraulic cement and SCM particle size when engineering a cement-SCM blend to have a desired PPD. It may also be advantageous to account for the extent to which cement and SCM particles become hydrated or react over time (e.g., between 1-28 days) to determine how both the cement and SCM particles affect strength development during this time. Cement particles that never fully hydrate but include unreacted cement cores do not impart their full strength-imparting potential and contain "wasted cement".

Hydraulic cement particles and SCM particles generally react from the outside in. Because the pozzolanic reaction is not apparent until after initial set (i.e., for at least about 3-7 days), and because limestone and other fillers are essentially inert, the particle size of most SCMs can be assumed to have constant particle size during early stages before initial set. However, the particle size of the hydraulic cement fraction is dynamic. The present disclosure accounts for dynamic changes in particle size of the hydraulic cement fraction and its effects on rheology.

The dissolution rate of hydraulic cement particles may depend on several factors, including chemistry and inherent reactivity, amount of available water, particle morphology, and competing reactions. A discussion of how Portland cement hydrates, including the depth of reaction as a function of time, is set forth in Osbaeck et al., "Particle Size Distribution and Rate of Strength Developement of Portland Cement," *J. Am. Ceram. Soc.,* 72 [2] 197-201 (1989). Table 1 of Osbaeck et al. provides the following approximations of depth of reaction as a function of time:

TABLE I

Depth of Reaction as a Function of Time

| Time (days)* | Depth of Reaction (μm) |
|---|---|
| 1 | 0.4-0.6 |
| 3 | 0.8-1.2 |
| 7 | 1.5-2.0 |
| 28 | 3-4 |
| 91 | 5-7 |

*(20° C.)

The foregoing table is for cement paste that includes 100% OPC at unspecified w/c with no SCM. The depth of reaction as a function of time is likely different when variables are altered. It must be emphasized that Osbaeck et al. do not disclose how to manufacture engineered cement-SCM blends. Nor do Osbaeck et al. disclose how to design narrow PSD cements for making engineered cements or for any purpose. The assumptions and principles employed herein when designing narrow PSD cements have been developed for the purpose of designing particle packed engineered cements that contain hydraulic cement and SCM fractions. Nevertheless, once one understands how to design particle packed engineered cements as disclosed herein in order to improve flow in initial stages and increase the short- and long-term strength-imparting potential of hydraulic cement, the foregoing table can provide insights as to how one might select a Portland cement having a narrow PSD for blending with one or more SCM fractions.

For example, in a blend where it is desired for some of the Portland cement particles to completely hydrate in 1 day, and others to completely hydrate in 3 days, 7 days, 28 days, and 91 days, respectively, and assuming that cement particles are perfectly spherical (in which case reaction depth equals the radius, and hydration proceeds evenly around the particle perimeter), a hypothetical distribution of perfectly spherical cement particles could include the following particle size fractions, in which the "ideal" diameter is twice the radius, or reaction depth from all sides):

| Day | Particle Diameter (μm) |
|---|---|
| 1 | 0.8-1.2 |
| 3 | 1.6-2.4 |
| 7 | 3.0-4.0 |
| 28 | 6-8 |
| 91 | 10-14 |

Thus, in order for the various particle size fractions within a distribution of cement particles to be fully hydrated at 1, 3, 7, 28 and 91 days, an example ideal Portland cement with spherical cement particles might have a PSD spanning a range of about 0.8-14 μm. Grinding cement particles to below 0.8 μm might be wasteful if they increase water demand without providing a corresponding strength benefit. Providing cement particles above 14 μm might be wasteful to the extent they do not fully hydrate but include "wasted" cores as expensive filler.

However, the particle size range of the foregoing example is for particles that are perfectly spherical. Because cement particles are jagged and can have aspect ratios (length-to-width) between about 1-2, cement particles larger than 0.8-1.2 μm may be essentially fully hydrated at 1 day, cement particles larger than 1.6-2.4 μm may be essentially fully hydrated at 3 days, etc. Nevertheless, larger cement particles may behave more like spherical particles as hydration proceeds over days or weeks and jaggedness becomes less pronounced. Smaller cement particles may be more sensitive to deviations from spherical because, by the time their rough edges are rounded off, they may be completely dissolved. Moreover, particles with fractures, sharp edges and porosity tend to hydrate faster and are more susceptible to rapid dissolution.

In another example, where the smallest cement particles have an aspect ratio of 2, a particle of 1.6-2.4 μm in length and 0.8-1.2 μm in width might be essentially fully hydrated after one day. Accordingly, the "diameter" of a particle with a length of 1.6-2.4 μm and an aspect ratio of 1.5-2 may "effectively" be about 2 μm. Thus, the lower PSD endpoint of non-uniform cement particles can be about 2 μm instead of 0.8 μm. Grinding non-uniform cement particles smaller than 2 μm may be unnecessary and wasteful. Moreover, for larger cement particles with an aspect ratio of about 1.5 and/or that hydrate more rapidly than perfect spheres as a result of uneven morphology, the upper PSD endpoint of such cement particles may be about 21 μm instead of 14 μm. Thus, the present invention includes narrow PSD cements with particles that range between about 2-21 μm (e.g., have a $d_1$ of 2 μm and a $d_{99}$ of 21 μm). Depending on the shape of the PSD curve, the d10 of this hypothetical narrow PSD cement might be about 1-3 μm greater than 2 μm and the d90 might be about 2-6 μm less than 21 μm. Other variables may affect the rate of cement particle dissolution, including, but not limited to, the type(s) and/or amount(s) of SCM in a cement-SCM blend, cement chemistry and reactivity, amount of available water in the system over time, ambient temperature, rate of water evaporation, heat of hydration, accumulation of internal heat, or slab thickness.

One should keep in mind that the reaction depths noted in Osbaek were observed in OPC having a d10 of perhaps 1.5 μm and a d90 of perhaps 45 μm. When the effects of the Le Chatelier principle are considered, the rate of dissolution and hydration of the smallest cement particles may affect the rate and depth of hydration of larger cement particles, both at early and later ages. After the smallest cement particles have dissolved and saturated the water with dissolved ions (e.g., calcium, magnesium, silicate, aluminate, and aluminoferrite ions), further hydration of cement particles only takes place as solid hydration products precipitate out, freeing up water molecules for further dissolution of cement particles. The rate of such further hydration is related to the rate of formation of hydration products, keeping in mind that water is a reactant and is used up to some extent as hydration products form. Nevertheless, for every water molecule consumed during formation of a precipitated hydration product, several are freed up to continue the process of ion dissolution, followed by formation of precipitated hydration products. Eventually, all the water is either used up in formation of hydration products, is trapped as interstitial water and/or is evaporated, at which time hydration essentially stops.

The inventors postulate that reducing the proportion of ultrafine cement particles that dissolve immediately and/or before initial set increases the dissolution rate of larger cement particles according to the Le Chatelier principle. If the cement fraction includes fewer ultrafine cement particles that preferentially compete for water, more water will remain available to dissolve larger cement particles according to the Le Chatelier principle. If one assumes that saturation, not particle size or surface area per se, is the primary limiting rate variable for dissolution, and if some or all of the cement particles that would otherwise dissolve immediately or before initial set are removed and replaced by slow- or non-dissolving SCM, the larger cement particles should dissolve and hydrate faster. In such case, the hydration depth chart of Osbaek may understate the reaction depth rate of a narrow PSD cement having a higher d10 in a cement-SCM blend. It is postulated that increasing the reaction rate of all cement particles causes the smallest particles that remain to more quickly dissolve as compared to if they had to compete with even smaller cement particles for water if such particles had not been removed (e.g., as with OPC).

It is further postulated that removing the smallest cement particles (e.g., below 2 μm) will cause the next highest fraction of cement particles (e.g., 2-4 μm) to become more fully hydrated in the first day. Removing cement particles below about 2 μm "levels the playing field" and permits cement particles up to about 4 μm to become fully hydrated at 1 day according to the Le Chatelier principle. Achieving the same or better dissolution from larger particles as compared to cement with smaller particles avoids the "wasted energy" of grinding the smaller cement particles.

This exercise can be repeated until the smallest size cement particle at the bottom end of the narrow PSD cement is identified that is essentially fully hydrated at 1 day (i.e., because it is able to "see" an effective "ocean of water" into which to dissolve, free of competition from smaller particles). As long as sufficient surface area is available for hydration, it may be beneficial to further narrow the PSD of the cement fraction by raising the lower particle size end range, with increased rate of reaction of the remaining larger cement particles. For example, eliminating cement particles below about 5-8 μm and replacing them with slow- or non-dissolving SCM "forces" the resulting smallest cement particles (i.e., 8-12 μm) to more rapidly hydrate according to the Le Chatelier principle. Of course, to the extent that all remaining cement particles react faster according to the Le Chatelier principle and are able to result in desired set time and early strength development, it may be unnecessary to include any cement particles that fully hydrate and/or dissolve within 1 day. Removing some or all of the coarser particles that do not become fully hydrated after 28, 56 or even 91 days is expected to provide further benefit by increasing the reactive surface area of the remaining cement particles. Dissolution rate may be further increased by modifying cement chemistry (e.g., increasing tricalcium mineral content).

By narrowing the PSD, the cement particles as a whole may contribute sufficient calcium ions for the water to become fully saturated with calcium ions immediately or shortly after mixing even in the absence of particles that immediately dissolve or dissolve before initial set, final set, or even 1 day. Achieving a desired dissolution rate while raising the $d_{10}$ of the cement may still provide sufficient heat of hydration for desired set time and sufficiently high temperature and pH to initiate the pozzolanic reaction, thereby benefiting the strength gain from the SCM fraction. Increasing the PPD of a cement-SCM blend lowers the w/cm, which would be expected to further benefit set time and short- and long-term strengths. The inclusion of finely ground limestone may further trigger dissolution of calcium ions from the cement particles according to the Le Chatelier principle (e.g., by providing nucleation sites that accelerate formation of hydration products and removal of dissolved ions from the aqueous system, which accelerates dissolution of the remaining cement particles).

The d10 of an example narrow PSD cement useful for particle packing with an SCM can range from about 2-15 μm, 3.5-12.5 μm, 5-11.5 μm, or 7-10 μm. To the extent it is desired for all cement particles to be fully hydrated at 91 days, 56 days, or 28 days, and depending on the d10 and other factors that affect the reaction depth as a function of time as discussed above, the d90 of an example narrow PSD cement useful for particle packing with one or more SCMs can be between about 10-35 μm, about 12-30 μm, about 14-27 μm, or about 16-24 μm.

In short, including ultrafine cement particles (e.g., below about 2-5 μm) can be wasteful and undesirable because they require excessive energy to grind, react excessively fast, and retard short- and/or long-term hydration of larger cement particles. They may create too much viscous, non-particulate gel and yield in a more poorly packed particle system. Replacing ultrafine cement particles with slow- or non-dissolving SCM particles provides a better packed system with a higher volume of particulate solids and a lower volume of interstitial water. Including coarse cement particles is wasteful to the extent they do not fully hydrate but leave unhydrated cores that act as expensive filler, both in terms of manufacturing cost and environmental footprint (e.g., "wasted" $CO_2$ and energy expended to manufacture unhydrated cement filler cores). Thus, providing a narrow PSD cement with a higher d10 and a lower d90 compared to OPC and blending the cement with complementary sized SCM particles maximizes the beneficial strength-imparting effects of the cement fraction while lower water demand and w/cm and increasing strength.

Because a narrow PSD cement has lower PPD compared to OPC (e.g., having a Fuller distribution), it is necessary according to the disclosure to increase the PPD of the overall engineered cement-SCM blend by selecting one or more SCMs that provide complementary sized particles. According to one embodiment, at least one SCM fraction is provided that has a mean particle size (MPS) that differs from the MPS of the narrow PSD cement fraction by a multiple of at least 3.0, more preferably at least about 3.25, 3.5, 3.75, 4, 4.25, 4.5, 5, 5.5 or 6, in order to yield a cement-SCM blend having an "initial PPD" (before adding water) of at least 57.0%, more preferably at least about 58%, 60%, 62.5%, 65%, 70%, or 75%.

For example, if the d50 of a narrow PSD cement is 15 μm, an exemplary particle packed cement-SCM blend may include a first finer SCM fraction having a d50 of 5.0 μm or less and a second SCM fraction having a d50 of 45 μm or greater in order to achieve a PPD of 57.0% or greater. Nevertheless, it may be permissible in some cases for the difference between the MPS of one SCM fraction and the MPS of the narrow PSD cement fraction to be less than a multiple of 3.0 so long as the MPS of the other SCM fraction differs from the MPS of the narrow PSD cement fraction by a multiple of 3.5 or greater and/or so long as the PPD of the cement-SCM blend is at least 57.0%.

In some cases, it may be desirable for there to be little or no overlap between the PSDs of the cement and SCM fractions or even a gap between the upper particle size of one fraction and the lower particle size of the next larger fraction. For example, the amount of overlap can be less than about 25%, preferably less than about 18%, more preferably less than about 12%, even more preferably less than about 8%, and most preferably less than about 4% by weight of the combined fractions. In some cases, there may be a gap of at least about 2.5% based on particle size between the d10, d5 or d1 of one fraction and the d90, d95 or d99 of the next smaller fraction, more preferably at least about 5%, 7.5%, 10%, 12.5%, 15%, 17.5%, or 20% (e.g. "negative overlap" or "overlap" of less than about −2.5, −5%, −7.5%, −10%, −12.5%, −15%, −17.5% or −20%).

The use of separate fine and coarse SCM fractions on one or both sides of the narrow PSD cement fraction is beneficial for many reasons, including, but not limited to, reduced capillary pore volume, which reduces permeability and transport and increases durability and resistance to chemical attack, reduced autogenous shrinkage and creep, a reduced amount of water within the cement paste to yield a given flow, and increased volumetric paste density (i.e., when normalized for specific gravities of the SCM and cement fractions).

B. Evolution of Roman Cement™

Engineered particle packed cements are an improvement over OPC, which generally has a PPD of less than 50% and includes a substantial quantity of coarse cement particles that never fully hydrate and yield "wasted" cement cores. OPC is generally only optimized for use with itself and without regard to its behavior when used with SCMs. This is especially true when OPC is used by concrete manufactures to make "site blends" with SCMs or when SCMs and OPC are otherwise "self-blended" by the end user.

Engineered particle packed cements disclosed herein are also an improvement over interground cement-SCM blends, which seek to "fix" SCMs and make them more reactive by intimate grinding with OPC. Interground cement-SCM blends are generally more reactive and produce higher strength than site blends or other self-blended cementitious compositions. Nevertheless, interground blends often have higher water demand as a result of increased fineness, can have an even lower PPD than OPC, and may require greater quantities of (and/or more expensive) water reducers.

Engineered particle packed cements are also an improvement over the inventors' previous work in U.S. Pat. Nos. 7,799,128 and 7,972,432 ("first generation patents"). The first generation patents, incorporated by reference, describe "first generation" Roman Cement™ in which most or all of the coarse cement particles normally found in OPC are "removed" (e.g., to have a d85, d90 or d95 of 20 μm or less) and "replaced" with coarse pozzolan particles. Fly ash or other pozzolans can be dedusted to remove fine particles and reduce PSD overlap between the cement and pozzolan fractions in order to reduce water demand. First generation Roman Cement™ increases net cement reactivity (e.g., the net quantity of strength imparted by a given weight or volume of cement) by eliminating or reducing unhydrated cement cores and uses less expensive coarse fly ash or other pozzolan particles instead of more expensive cement particles.

The National Institute of Standards and Technology (NIST) tested several "first generation" cement-fly ash blends and identified potential commercially viable blends in which 20-35% of the cement was replaced by an equivalent volume of fly ash and that essentially equaled or exceeded the strength of OPC at all stages between 1-192 days and which had acceptable set times. Nevertheless, water demand was an issue for some blends tested by NIST due to technical limitations of the classification and milling equipment used to provide the test materials. As a result, some blends tested by NIST required significant, but economically feasible, quantities of high range water reducer to maintain the same flow as 100% OPC. Notwithstanding the high fineness of the cement fractions, the coarser fly ash mitigated water demand and autogenous shrinkage.

"Second generation" Roman Cement™ was developed to address water demand and/or enhance SCM reactivity. In second generation Roman Cement™, a narrow PSD cement is combined with one or more SCM fractions to form "gap graded" binary, ternary, and quaternary blends. Replacing at least a portion of ultrafine cement particles with more slowly dissolving SCM particles decreases water demand by freeing up water to lubricate larger particles. It also increases net SCM reactivity whenever finer SCM particle are more reactive than coarser SCM particles.

A ternary cement-SCM blend is disclosed in U.S. Provisional Application No. 61/324,741, filed Apr. 15, 2010. Narrow PSD cements, binary, ternary, and quaternary blends made therewith, and methods for manufacturing narrow PSD cements and blends are more particularly described in U.S. Provisional Application No. 61/365,064, filed Jul. 16, 2010, U.S. Provisional Application No. 61/413,966, filed Nov. 15, 2010, U.S. Provisional Application No. 61/450,596, filed Mar. 8, 2011, International Patent Application No. PCT/US11/32442, filed Apr. 14, 2011 (WO 2011130482, published Oct. 20, 2011), and U.S. patent application Ser. No. 13/183,205, filed Jul. 14, 2011. (collectively "second generation patents", incorporated by reference).

First and second generation cement-SCM blends can be designed to have an overall PSD that is similar to that of OPC (e.g., a Fuller distribution). They are also "gap graded" because the mean particle size (MPS) of the coarser SCM fraction is substantially higher than the MPS of the finer cement fraction. In the case of ternary blends, the MPS of the cement fraction may also be substantially higher than the MPS of the fine SCM fraction. That is in contrast to site blends and other self-blended mixtures of OPC and SCM, as well as interground cement-SCM blends, which are not gap graded but have substantial or total overlap between the PSDs of the cement and SCM fractions.

Other examples of gap graded cement-SCM blends are described in Zhang, et al., "A new gap-graded particle size distribution and resulting consequences on properties of blended cement," Cement & Concrete Composites 33 (2011) 543-550 ("Zhang I"), incorporated by reference. In a hypothetical gap graded Fuller distribution schematically illustrated in Table 1 (p. 544), the mean particle size (MPS) of the second middle fraction (16 μm) is 2.67 times higher than the MPS of the third finer fraction (6 μm), and the MPS of the third coarser fraction (45 μm) is 2.81 times higher than the MPS of the second middle fraction (16 μm). The tested cement-SCM blends had gap graded fractions similar to the corresponding cement clinker fractions shown in Table 3 (p. 544-545), in which the MPS of the clinker fraction (15.08 μm) is 2.89 times higher than the MPS of the finer SCM fraction (5.21 μm), and the MPS of the coarser SCM fraction (44.21 μm) is 2.93 times higher than the MPS of the clinker fraction (15.08 μm). As seen in FIGS. 2(a) and 3(a) of Zhang I, there is significant overlap between the PSDs of the three gap graded cement clinker fractions. As shown in Table 4 (p. 546), the gap graded cement-SCM blends of Zhang I were made using various combinations of cement clinker, blast furnace slag, fly ash, steel slag, and limestone. "Reference cement" was prepared by co-grinding 36% blast furnace slag, 25% cement clinker, and 39% fly ash. The gap graded cement-SCM blends had PPDs (or "maximum volume concentration of solids (%)") ranging from 50.17-53.63, higher than the PPDs of Portland cement (46.88) and reference cement (44.73).

Other examples of cement-SCM blends are described in Zhang, et al., "Study on optimization of hydration process of blended cement," J. Therm. Anal. calorim DOI 10.1007/ s10973-011-1531-8 (Apr. 8, 2011) ("Zhang II"), incorporated by reference. The cement-SCM blends of Zhang II include five fractions, which one might characterize as first fine SCM, second fine SCM, third middle cement, fourth coarse SCM, and fifth coarser SCM. According to Table 4 of Zhang II, three cement-SCM blends were made using various combinations of cement clinker, blast furnace slag, fly ash, and steel slag, and "reference cement" was prepared by co-grinding 36% ground granulated blast furnace slag (GGBFS), 25% cement clinker, and 39% fly ash. The cement-SCM blends had PPDs (or "maximum volume concentration of solids (%)") ranging from 55.62-56.62, which were higher than the PPDs of the Portland cement (49.12) and Reference cement (45.40). The cement-SCM blends of Zhang I and II resemble, and may be examples of, second generation Roman Cement™.

Zhang I and II also provide the following equation useful for determining the particle packing density of a cement material:

$$\varphi = \frac{\rho_{wet} - \rho_w}{\rho_c - \rho_w} \quad (1)$$

where
$\phi$=maximum solids volume concentration in a cement paste
$\rho_{wet}$=maximum density of wet paste
$\rho_w$=density of water
$\rho_c$=density of cement Although used to determine the packing densities of the OPC, cement-SCM blends, and reference cement disclosed in Zhang I and II, the foregoing equation can be used to determine the particle packing densities of engineered particle packed cements within the scope of the invention, characterized as "third generation" Roman Cement™. For purposes of this disclosure, the "maximum density of wet paste" can be understood as the density of a cement paste that includes just enough water to wet the cement and SCM particles and fill the void spaces between the particles in the cement paste (e.g., without significant bleeding of water from the cement paste).

III. Particle Packed Cement-SCM Blends

A. Definitions and Example Materials
1. Hydraulic Cement

The terms "hydraulic cement" and "cement" shall include Portland cement, cements defined by ASTM C150 (Types I-V) and similar materials that contain one or more of the four clinker minerals: $C_3S$ (tricalcium silicate), $C_2S$ (dicalcium silicate), $C_3A$ (tricalcium aluminate), and $C_4AF$ (tetracalcium aluminoferrite). Other examples of hydraulic cement include white cement, calcium aluminate cement, high-alumina cement, magnesium silicate cement, magnesium oxychloride cement, oil well cements (e.g., Type VI, VII and VIII), magnesite cements, and combinations of these. Ground granulated blast-furnace slag (GGBFS) and other slags that include one or more clinker minerals may also function as hydraulic cement. They also qualify as SCMs. Some highly reactive class C fly ashes have self-cementing properties and can qualify as "hydraulic cement".

Consistent with defining GGBFS, slags and reactive fly ashes as "hydraulic cement", alkali-activated cements, sometimes known as "geopolymer cements", are also examples of "hydraulic cements". It will be appreciated that when geopolymer cements or other highly reactive pozzolans are used, two or more separately graded pozzolan fractions may be combined together to increase the particle packing density of the overall particle system to at least 57.0, either alone or in combination with a less reactive SCM or non-reactive SCM filler.

2. Supplementary Cementitious Materials

The terms "Supplementary Cementitious Material" and "SCM" shall include materials commonly used in the industry as partial replacements for Portland cement in concrete, mortar and other cementitious materials, either in blended cements or by self-blending in the end user. Examples range from highly reactive materials (e.g., GGBFS), moderately reactive materials (e.g., Class C fly ash, steel slag, silica fume, activated metakaolin, metastable forms of $CaCO_3$), lower reactive materials (e.g., Class F fly ash, volcanic ash, natural pozzolans, trass, and metastable forms of $CaCO_3$), and essentially non-reactive materials and fillers (e.g., ground limestone, ground quartz, precipitated $CaCO_3$, precipitated $MgCO_3$). Through alkali activation, it is possible for some SCMs to also become hydraulically reactive. In a sense, the pozzolanic reaction is a form of alkali activation, albeit by more weakly basic calcium ions as compared to strongly basic sodium or potassium ions as in typical geopolymer cements.

B. Particle Sizes in Particle Packed Cement-SCM Blends
1. Narrow PSD Hydraulic Cements Particle packed cement-SCM blends having improved strength and/or reduced water demand include a narrow PSD cement fraction. According to one embodiment, the PSD of the cement fraction can be defined by its d10, d50 and d90, with the d10 approximating the lower PSD endpoint ("LEP"), the d90 approximating the upper PSD endpoint ("UEP"), and the d50 approximating the mean particle size ("MPS") of the PSD. In other embodiments, the d1, d5, d15, or intermediate value can be used as the approximate LEP, the d85, d95, d99, or intermediate value as the approximate UEP, and the d40, d45, d55, d60 or intermediate value as the approximate MPS.

Narrow PSD cements are typically characterized as having a spread (e.g., UEP-LEP) and endpoint ratio (e.g., UEP/LEP) that are lower than the spread and endpoint ratio, respectively, of OPC, often substantially lower. Lowering the UEP reduces the volume of unhydrated cement cores, which increases hydration efficiency. Raising the LEP reduces water demand. In one embodiment, a narrow PSD cement fraction can have a LEP that is substantially higher, and a UEP that is substantially lower, than the respective LEP and UEP of OPC (e.g., for both Fuller and Tsivilis distributions).

For example, compared to Types I, II, IV and V OPC as defined by ASTM C150, the d10 of a narrow PSD cement can be substantially higher than the d10, and, in most cases, the d90 of a narrow PSD cement can be substantially lower than the d90, of these types of OPC. As compared to Type III OPC as defined by ASTM C150, the d10 of a narrow PSD cement can be substantially higher than the d10, and the d90 of the narrow PSD cement can be the same or less than the d90, of Type III OPC.

In one embodiment, the PSD of the cement fraction can be defined by the upper and lower PSD "endpoints" UEP and LEP (e.g., d90 and MO). The PSD can also be defined by the spread or difference between UPE and LPE (e.g., "d90-d10"). In another embodiment, the PSD of the cement fraction can be defined by the upper and lower endpoint ratio UEP/LEP (e.g., d90/d10). In yet another embodiment, the PSD can be defined by the lower median range LEP and MPS (e.g., d10 and d50). In still another embodiment, the PSD can be defined by the lower median ratio MPS/LEP (e.g., d50/d10). In another embodiment, the PSD can be defined by the upper median range MPS and UEP (e.g., d50 and d90). In yet another embodiment, the PSD can be defined by the upper median ratio UEP/MPS (e.g., d90/d50). The PSD can also be defined by any combination of the foregoing and/or similar methodologies to increase reactivity and/or decrease water demand compared to OPC and conventional cement-SCM blends.

To ensure the cement fraction has a PSD within desired parameters, care should be taken to accurately determine particle size. The particle size of perfectly spherical particles can be measured by diameter. While fly ash is generally spherical owing to how it is formed, Portland cement and some SCMs can be non spherical (i.e., when ground from larger particles). For these, "particle size" can be determined according to accepted methods for determining particle sizes of ground or otherwise non spherical materials. Particle size can be measured by any acceptable method and/or methods yet to be developed. Examples include sieving, optical or electron microscope analysis, laser diffraction, x-ray diffraction, sedimentation, elutriation, microscope counting, Coulter counter, and Dynamic Light Scattering.

a. Defining PSD by Lower and Upper Endpoints

The upper endpoint (UEP) can be selected to provide desired reactivity and/or fineness in conjunction with or independent of the lower endpoint (LEP) and/or a desired particle packing density in conjunction with one or more coarser SCMs. The UEP (e.g., d85, d90, d95 or d99) can be equal to or less than about 35 µm, 30 µm, 27.5 µm, 25 µm, 22.5 µm, 20 µm, 18 µm, 16.5 µm, 15 µm, 13.5 µm, 12 µm, 11 µm, or 10 µm. The lower UEP range limit can be about 8 µm, 9 µm, 10 µm, 11 µm, 12 µm, 13 µm, 14 µm or 15 µm.

The lower endpoint (LEP) can be selected to provide desired water demand and/or fineness in conjunction with or independent of the upper endpoint (UEP) and/or desired particle packing density in conjunction with one or more finer SCMs. The LEP (e.g., d1, d5, d10 or d15) can be equal to or greater than about 1.0 µm, 1.25 µm, 1.5 µm, 1.75 µm, 2 µm, 2.5 µm, 3 µm, 4 µm, 5 µm, 6 µm, 7 µm, or 8 µm. The upper LEP limit can be about 6 µm, 8 µm, 10 µm, 12 µm or 15 µm.

The UEP and LEP can also define the spread (UPE-LEP) of the hydraulic cement. By way of example, depending on the UEP and LEP of the cement and ability or limitations of processing equipment to produce narrow PDS cements, the spread can be less than about 30 µm, 25 µm, 22.5 µm, 20 µm, 17.5 µm, 15 µm, 13 µm, 11.5 µm, 10 µm, 9 µm, 8 µm, 7 µm, 6 µm, 5 µm, or 4 µm.

b. Defining PSD by UEP/LEP

In another embodiment, the ratio UEP/LEP can define a narrow PSD cement having desired reactivity, fineness and/or particle packing density in conjunction with one or more SCMs. The UEP/LEP (e.g., d90/d10) of narrow PSD cements can be less than the ratio of Types I-V cements as defined by ASTM C-150. According to several embodiments, the UEP/LEP can be less than or equal to about 25, 22.5, 20, 17.5, 15, 12.5, 10, 8, 6, 5, 4.5, 4, 3.5, 3, 2.5 or 2.

It will be appreciated that defining the PSD of a narrow PSD cement by ratio UEP/LEP is not limited by a particular UEP or LEP or range of particle sizes. For example, a first hypothetical narrow PSD cement having a d90 of 15 µm and a d10 of 3 µm has a UEP/LEP (i.e., d90/d10) of 5 and spread (d90-d10 of 12 µm. By comparison, a second hypothetical narrow PSD cement having a d90 of 28 µm and a d10 of 7 µm has a UEP/LEP (i.e., d90/d10) of 4 and a spread (d90-d10 of 21 µm. While the spread of the second hypothetical narrow PSD cement is greater the UEP/LEP (i.e., d90/d10) is smaller than those of the first hypothetical narrow PSD cement. Thus, the second hypothetical cement has a narrower PSD compared to the first hypothetical cement as defined by UEP/LEP (i.e., d90/d10) even though the spread is greater.

c. Defining PSD by Lower Median Range LEP to MPS

In another embodiment, the lower Median Range LEP to MPS can define a narrow the PSD cement having a desired reactivity, fineness and/or a desired particle packing density in conjunction with one or more SCMs. In general, reactivity and fineness (e.g., Blaine) of a hydraulic cement increase as the MPS decreases and water demand and fineness decrease as the LEP increases, all things being equal.

The upper endpoint MPS of the lower median range can be selected to provide desired reactivity, fineness and/or particle packing density in conjunction with or independent of either the LEP or UEP. The MPS (d40, d45, d55, d60) can be less than or equal to about 25 µm, 22.5 µm, 20 µm, 18 µm, 16 µm, 15 µm, 14 µm, 13 µm, 12 µm, 11 µm, 10 µm, 9 µm, 8 µm, 7 µm, 6.5 µm, 6 µm, 5.5 µm, or 5 µm, with a lower range limit of 3 µm, 3.5 µm, 4 µm, 4.5 µm, 5 µm, 6 µm, 7 µm, 8 µm, 10 µm or 12 µm.

The lower endpoint LEP of the lower median range can be selected to provide a desired water demand, fineness and/or particle packing density in conjunction with or independent of either the MPS or UEP. According to several embodiments, the LEP (e.g., d1, d5, d10 or d15) can be equal to or greater than about 1.0 µm, 1.25 µm, 1.5 µm, 1.75 µm, 2.0 µm, 2.5 µm, 3 µm, 4 µm, 5 µm, 6 µm, 7 µm, or 8 µm. The upper LEP range limit can be about 5 µm, 6 µm, 7 µm, 8 µm, 10 µm, 12 µm or 15 µm.

d. Defining PSD by Lower Median Ratio MPS/LEP

In another embodiment, the lower median particle size ratio MPS/LEP (e.g., d50/d10) can define a narrow PSD cement having a desired reactivity, fineness and/or particle packing density in conjunction with one or more SCMs. The ratio MPS/LEP of narrow PSD cements within the disclosure will generally be less than the ratio MPS/LEP of Types I-V cement as defined by ASTM C-150. According to several embodiments, the ratio d50/d10 can be less than or equal to 7.5, 6.5, 5.5, 5, 4.5, 4.25, 4, 3.75, 3.5, 3.25, 3, 2.75, 2.5, 2.25, 2, 1.75 or 1.5.

e. Defining PSD by Upper Median Range MPS to UEP

In another embodiment, the upper median range MPS to UEP can define a narrow PSD cement having a desired reactivity, fineness and/or particle packing density in conjunction with one or more SCMs. In general, the reactivity and fineness (e.g., Blaine) of hydraulic cement increase as the MPS decreases, and water demand and fineness decrease as the UEP increases, all things being equal.

The lower endpoint MPS of the upper median range can be selected to provide a desired reactivity, water demand, fineness and/or particle packing density in conjunction with or independent of either the UEP or LEP. According to several embodiments, the MPS (d40, d45, d55, d60) can be less than or equal to about 25 µm, 22.5 µm, 20 µm, 18 µm, 16 µm, 15 µm, 14 µm, 13 µm, 12 µm, 11 µm, 10 µm, 9 µm, 8 µm, 7 µm, 6.5 µm, 6 µm, 5.5 µm, or 5 µm and/or greater than or equal to about 3 µm, 3.25 µm, 3.5 µm, 4 µm, 4.5 µm, 5 µm, 5.75 µm, 6.5 µm, 8 µm, 10 µm or 12 µm.

The upper endpoint (UEP) of the upper median range can be selected to provide a desired reactivity, water demand, fineness and/or particle packing density in conjunction with or independent of either the LEP or MPS. According to several embodiments, the LEP (e.g., d1, d5, d10 or d15) can be equal to or greater than about 1.0 µm, 1.25 µm, 1.5 µm, 1.75 µm, 2 µm, 2.5 µm, 3 µm, 4 µm, 5 µm, 6 µm, 7 µm, or 8 µm. The upper UEP limit can be less than or equal to about 35 µm, 30 µm, 27.5 µm, 25 µm, 22.5 µm, 20 µm, 18 µm, 16.5 µm, 15 µm, 13.5 µm, 12 µm, 11 µm, or 10 µm. The lower UEP range limit can be about 8 µm, 9 µm, 10 µm, 11 µm, 12 µm, 13 µm, 14 µm or 15 µm.

f. Defining PSD by Upper Median Ratio UEP/MPS

According to another embodiment, the upper median particle size ratio UEP/MPS (e.g., d90/d50) can define a narrow PSD cement having a desired reactivity, fineness and/or particle packing density in conjunction with one or more SCMs. According to several embodiments of the invention, the ratio d90/d50 can be in a range of about 1.25 to 6, about 1.5 to 5.5, about 1.75 to about 5, about 2.0 to 4.5, about 2.25 to 4.25, about 2.5 to 4.0, about 2.75 to 3.75, about 2.9 to 3.6, or about 3.0 to 3.5.

2. Exemplary SCM Fractions

The PSD of one or more SCM fractions can be defined by the d10, d50 and d90, with the d10 approximating the lower PSD endpoint (LEP), the d90 approximating the upper PSD endpoint (UEP), and the d50 approximating the mean particle size ("MPS"). In other embodiments, the d1, d5, d15 or intermediate value can be used to approximate LEP, the d85, d95, d99 or intermediate value to approximate UEP, and the d40, d45, d55, d60 or intermediate value to approximate MPS. In some cases, the PSD of an fine SCM fraction may be defined mainly or exclusively in terms of the MPS and/or the UEP, while the PSD of a coarse SCM fraction may be defined mainly or exclusively in terms of the MPS and/or the LEP.

a. Fine SCM Fraction

Blending a fine SCM fraction with a narrow PSD cement can "replace" at least a portion of ultra-fine cement particles, help disperse cement particles, fill fine pore spaces, increase fluidity, increase strength, and decrease permeability.

To achieve particle packing relative to the narrow PSD cement, the MPS of the narrow PSD cement fraction can be at least about 3.0 times, 3.25 times, 3.5 times, 3.75 times, 4 times, 4.5 times, 5 times, 5.5 times, or 6 times the MPS of the fine SCM fraction (e.g., about 3.0-10 times, 3.25-8 times or 3.5-6 times). In some cases, the engineered cement-SCM blend may include one or more coarse SCM fractions that, together with the narrow PSD cement fraction, provide sufficient particle packing density that the fine SCM fraction may be merely gap graded relative to the cement fraction (e.g., where the MPS of the cement fraction is less than 3.0 times, 2.8 times, 2.7 times, 2.6 times, or 2.5 times the MPS of the fine SCM fraction).

The UEP of the fine SCM fraction can be selected to be less than, approximately equal to, or greater than the LEP of the narrow PSD cement fraction. In general, the lower the UEP of the fine SCM fraction is relative to the LEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5% 10%, 12.5%, 15%, 17.5% or 20% between the UEP of the fine SCM and the UEP of the narrow PSD cement.

The UEP (e.g., d85, d90, d95 or d99) of a fine SCM can be less than about 18 µm, 15 µm, 12 µm, 10 µm, 9 µm 8 µm, 7 µm, 6 µm, 5 µm, 4.5 µm, 4 µm, 3.5 µm, or 3 µm. The lower UEP range limit can be about 1 µm, 2 µm or 3 µm. The LEP (e.g., d1, d5, d10 or d15) can be equal to or greater than about 0.01 µm, 0.05 µm, 0.1 µm, 0.5 µm, 1.0 µm, 1.25 µm, 1.5 µm, 1.75 µm, 2 µm, 2.5 µm, 3 µm, 4 µm, or 5 µm. The upper LEP range limit can be about 8 µm, 6 µm, 5 µm or 4 µm.

b. Coarse SCM Fraction

Blending a coarse SCM fraction with a narrow PSD cement can "replace" coarse cement particles, greatly increase particle packing, provide a filling effect using a less expensive component, lower the w/cm, increase fluidity, increase strength, reduce shrinkage, and reduce creep.

To achieve particle packing relative to the narrow PSD cement, the MPS of the coarse SCM fraction can be at least 3.0 times, 3.25 times, 3.5 times, 3.75 times, 4 times, 4.25 times, 4.5 times, 5 times, 5.5 times, or 6 times the MPS of the narrow PSD cement fraction (e.g., about 3.0-10 times, 3.25-8 times or 3.5-6 times). In some cases, the engineered cement-SCM blend may include a fine SCM fraction and/or a second coarser SCM fraction that, together with the narrow PSD cement fraction, provides sufficient particle packing density that the coarse SCM fraction may be merely gap graded relative to the cement fraction (e.g., where the MPS of the coarse SCM fraction is less than 3.0 times, 2.8 times, 2.7 times, 2.6 times, or 2.5 times the MPS of the narrow PSD cement fraction).

The LEP of the coarse SCM fraction can be selected to be less than, approximately equal to, or greater than the UEP of the narrow PSD cement fraction. In general, the higher the LEP of the coarse SCM fraction is relative to the UEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5%, 10%, 12.5%, 15%, 17.5% or 20% between the LEP of the coarse SCM and the LEP of the narrow PSD cement.

The LEP (e.g., d1, d5, d10 or d15) of a coarse SCM can be equal to or greater than about 8 µm, 10 µm, 12.5 µm, 15 µm, 17.5 µm, 20 µm, 22.5 µm, 25 µm, 30 µm, 35 µm, 40 µm, or 50 µm, with an upper LEP range limit of about 30 µm, 40 µm, 50 µm, 60 µm, 70 µm, 80 µm or 90 µm. The UEP (e.g., d85, d90, d95 or d99) of a coarse SCM can be less than about 300 µm, 250 µm, 200 µm, 175 µm, 150 µm, 125 µm, 110 µm, 100 µm, 90 µm, 85 µm, 80 µm, 75 µm, 70 µm, 65 µm, or 60 µm, with a lower UEP range limit of about 30 µm, 40 µm, 50 µm, or 60 µm.

c. Second Coarse SCM

In the case where the cement-SCM blend includes a narrow PSD cement fraction having a relatively low UEP and/or a coarse SCM fraction having a relatively low UEP, it may be desirable to include a second coarse SCM fraction that has a higher MPS than the MPS of the first coarse SCM fraction, advantageously is higher LEP than the UEP of the first coarse SCM (e.g., in order to provide additional particle packing relative to the narrow PSD cement fraction and/or fine aggregate in concrete or mortar).

The MPS of the second coarse SCM fraction can differ by a multiple of 3.0 or more relative the MPS of the first coarse SCM fraction (e.g., so as to provide an "ultra-coarse SCM fraction) and/or fine aggregate (e.g., sand) to maximize particle packing potential. Alternatively, the second coarse SCM fraction may be merely gap graded relative to the first coarse SCM fraction and/or fine aggregate (e.g., where the MPS of the second coarse SCM fraction differs by a multiple of less than 3.0. 2.75, 2.5, 2.0, or 1.5 relative to the MPS of the first coarse SCM fraction and/or fine aggregate).

C. Example Methods of Manufacture

FIG. 1A is a flow chart illustrating an example method 100 for manufacturing hydraulic cement having a narrow PSD. Example manufacturing apparatus are illustrated in FIGS. 4A-4D, 5A-4D, 6A-6F and 7A-7E (discussed below). In act 102, cement clinker (e.g., clinker used to make Types I-V Portland cement or Type VI-VIII oil well cement) is ground to an initial fineness and/or PSD. This can be performed by known or modified grinding apparatus such as a rod mill, vertical roller mill ("VRM"), high pressure grinding roll, hammer mill, or ball mill. The desired fineness and/or PSD of the initial cement may be selected based on subsequent classification and regrinding processes. The d10 of the initial ground cement will advantageously be as high or higher than the d10 of the narrow PSD cement.

In act 104, the initial ground cement is processed using one or more separators to yield cement fractions having different PSDs, including at least one finer fraction, which may be collected without further modification, and at least one coarser fraction. The finer cement fraction has a d90 that may be equal to, approximate, or be within a specified deviation of the d90 of the final cement product. The finer cement fraction will typically have a lower d10 than the initial ground cement by removing the coarser particles. The coarser fraction can optionally be dedusted one or more times to further remove fine particles and yield a coarse cement better suited for subsequent milling without forming an excessive quantity of ultrafine cement particles. Fines produced by dedusting can be blended with the finer fraction.

In act 106, the coarse fraction(s) produced by classification 104 are milled using appropriate milling apparatus, such as rod mill, VRM, fine grinding roll press, high pressure grinding roll, ball mill, impact ball mill, hammer mill, jet mill, dry bead mill, ultrasonic comminuting mill, or other mill designed to mill cement particles and yield one or more reground cement fractions having a desired d90, preferably without producing an undesired quantity of ultrafine particles. A reground cement intermediate can be processed one or more times by optional classifying act 108 to yield one or more additional fine cement fractions having a desired d90 and d10 and a coarser cement fraction that can be reground. Regrinding 106 and optional classifying 108 can be performed by the same or different apparatus used for initial grinding 102.

In act 110, one or more classified fine fractions are blended with one or more reground coarse fractions to yield one or more cement products having a desired d90 and d10. Blending can be performed by dedicated dry blending apparatus and/or one or more classifiers described above and/or illustrated in the Figures.

In one embodiment, it may be desirable to dedust one or more fine fractions and/or the final material to raise the d10 as desired. The removed fine particles typically have high value and can be beneficially used in applications where high fineness cements are desired, such as in making grout. The removed fines can alternatively be used as a blending material for OPC or other cements to raise Blaine fineness.

Figure 1B:
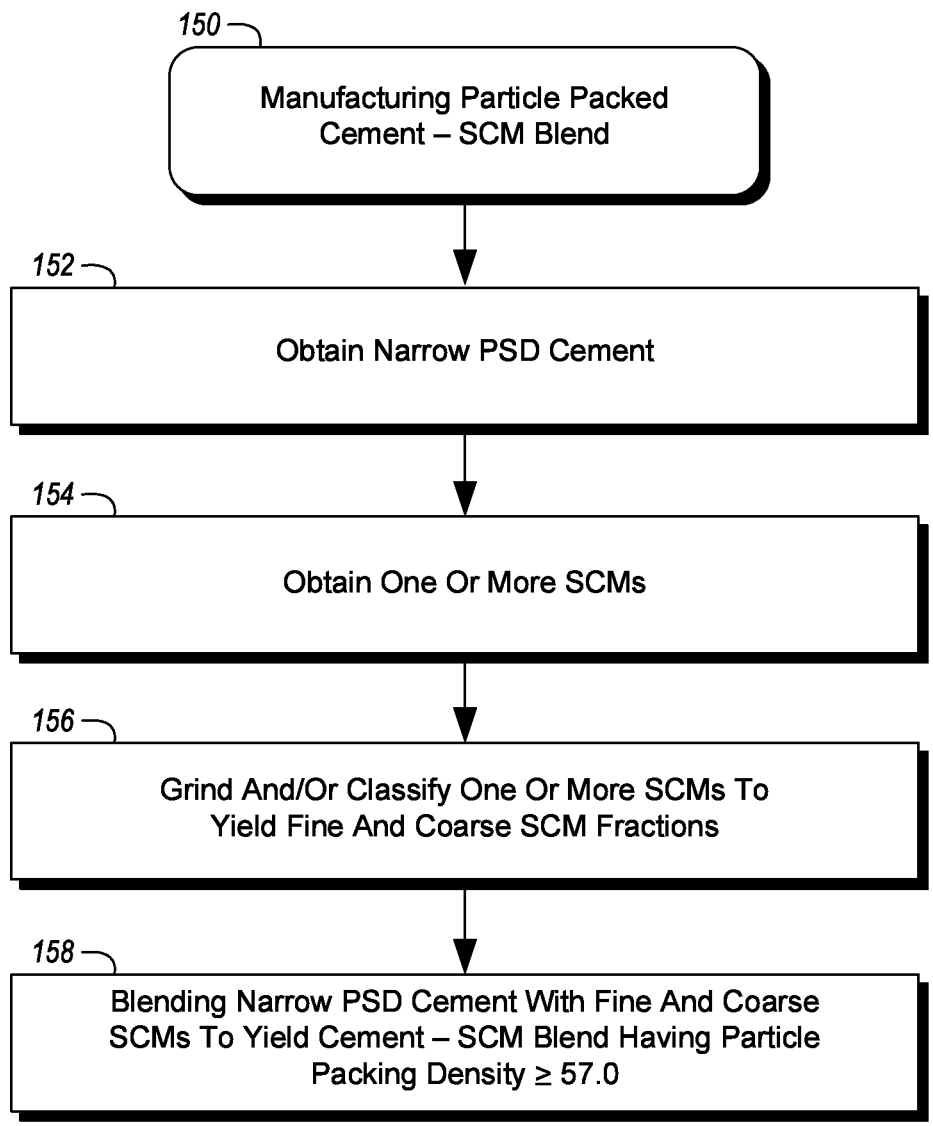

FIG. 1B is a flow chart illustrating an example method 150 for manufacturing particle packed cement-SCM blends. In step 152, a narrow PSD cement is obtained. In step 154, one or more SCMs are obtained. In step 156, the one or more SCMs are ground and/or classified to yield fine and coarse SCM fractions (e.g., using any apparatus described herein for grinding and separating cement). In step 158, the narrow PSD cement is blended with the fine and coarse SCM fractions to yield a cement-SCM blend having a particle packing density of at least 57.0%. The foregoing method can be adapted to yield a binary cement-SCM blend (e.g., fine cement and coarse SCM fractions), a ternary blend (e.g., fine SCM, narrow PSD cement, and coarse SCM fractions), or quaternary blend (e.g., fine SCM, narrow PSD cement, first coarse SCM fraction, and second coarser SCM fractions).

D. Example Particle Packed Cement-SCM Blends

Particle packed cement-SCM blends generally have high PPD to reduce water demand, or the amount of water required to achieve a desired flow, which decreases w/cm and increases strength compared to similarly proportioned cement-SCM blends that are not well particle packed (e.g., site blends, interground blends, and gap graded blends in which none of the fractions has an MPS that differs from the MPS of an adjacent fraction by at least 3.0 and/or which have a PPD greater than 57.0). According to one embodiment, a narrow PSD cement is blended with one or more SCM fractions to yield a cement-SCM having an initial PPD (e.g., after mixing with water and before initial set, or within 15 minutes, 30 minutes, 60 minutes, 120 minutes, or 180 minutes of mixing with water) of at least 57.0%, or at least about 58%, 59%, 60%, 62.5%, 65%, 67.5%, 70%, or 75%. Exemplary particle packed cement-SCM blends include binary, ternary and quaternary blends of cement and SCM.

Figure 2:
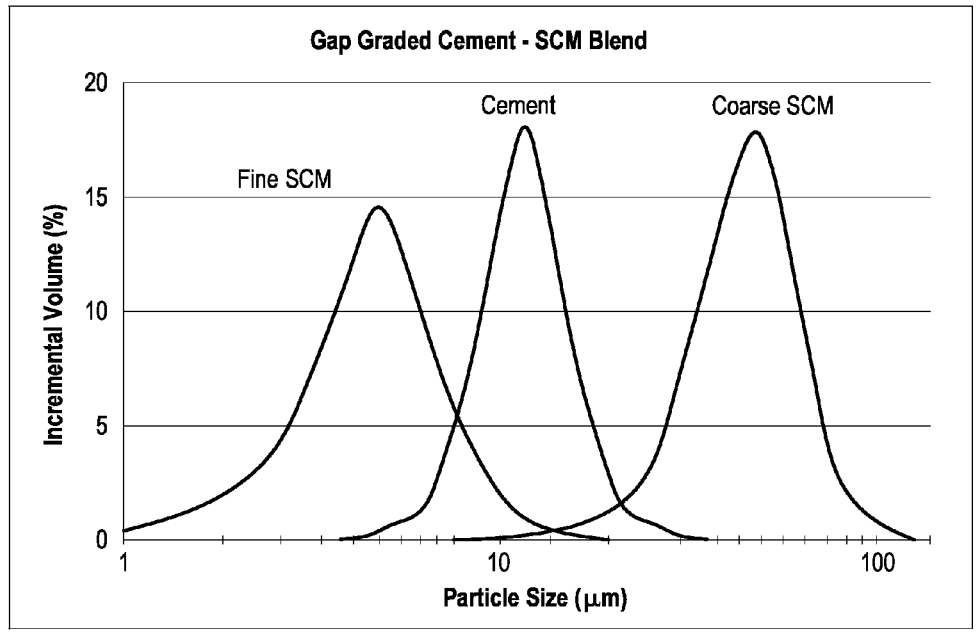
FIG. 2 is graph that schematically illustrates example PSDs of cement and SCM components of a gap graded cement-SCM blend.
Figure 3A:
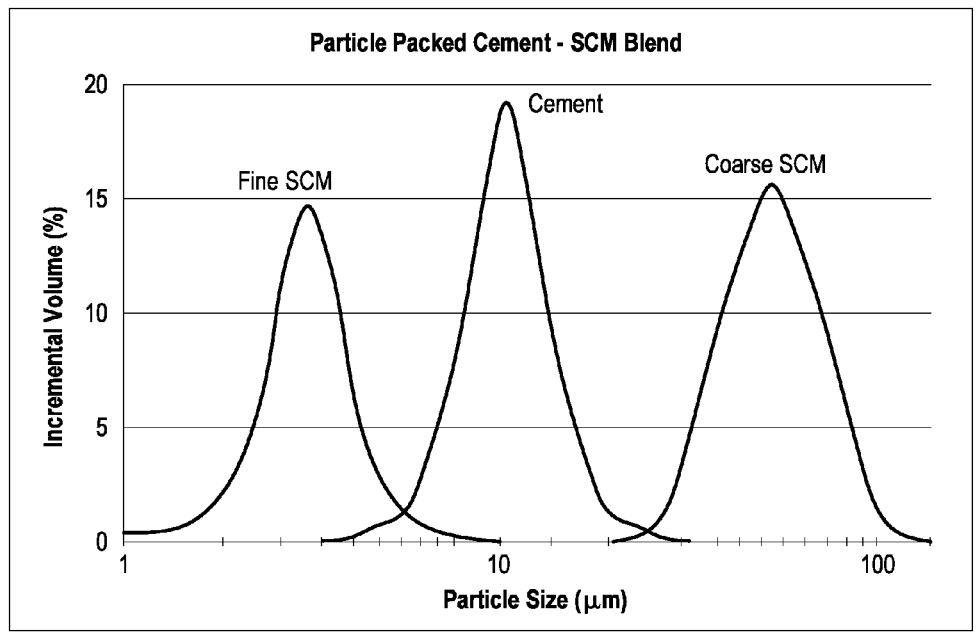
FIGS. 3A-3E are graphs that schematically illustrate example PSDs of cement and SCM components of exemplary particle packed cement-SCM blends FIGS. 4A-4D schematically illustrate example single classifier milling and classification systems for manufacturing a narrow PSD hydraulic cement.

FIGS. 2 and 3A-3E show the PSDs of cement and SCM fraction of various cement-SCM blends. FIG. 2 is graph that schematically illustrates, for comparison purposes, PSDs of the fine SCM, cement, and coarse SCM fractions of an example gap graded cement-SCM blend having a PPD of less than 57.0 (i.e., between 50.17-53.63). FIGS. 3A-3E are graphs that schematically illustrate example particle packed cement-SCM blends. A characteristic of the gap graded blend of FIG. 2 is the considerable overlap in the PSDs of the three adjacent fractions, and even some overlap between the fine and coarse SCM fractions. Another characteristic is a smaller separation between the MPS of all three fractions (i.e., MPS multiple of less than 3.0 times between adjacent fractions). The result is a PPD that is only marginally higher than the PPD of a corresponding OPC (i.e., 46.88).

Figure 3B:
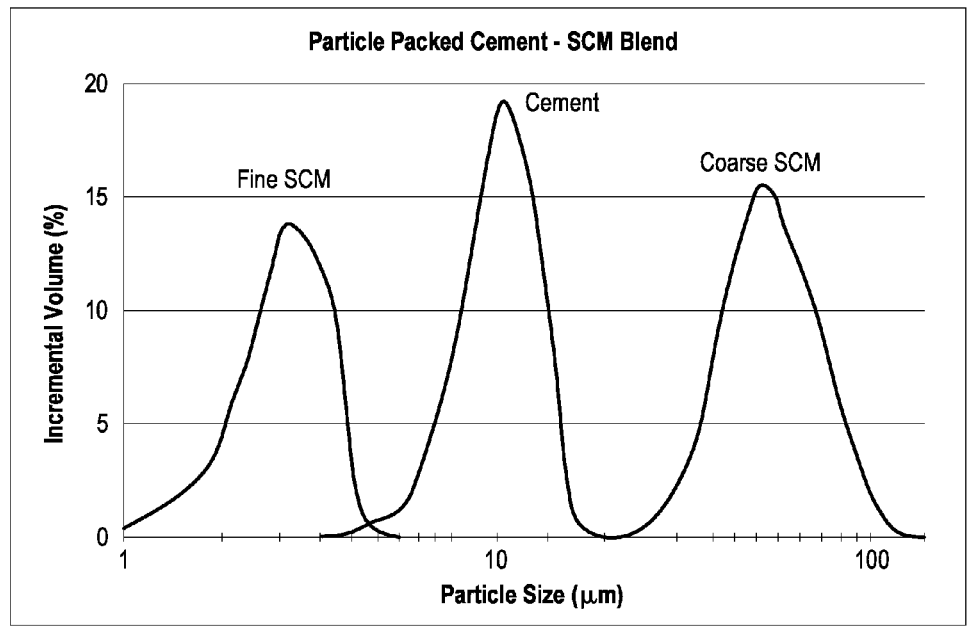
Figure 3C:
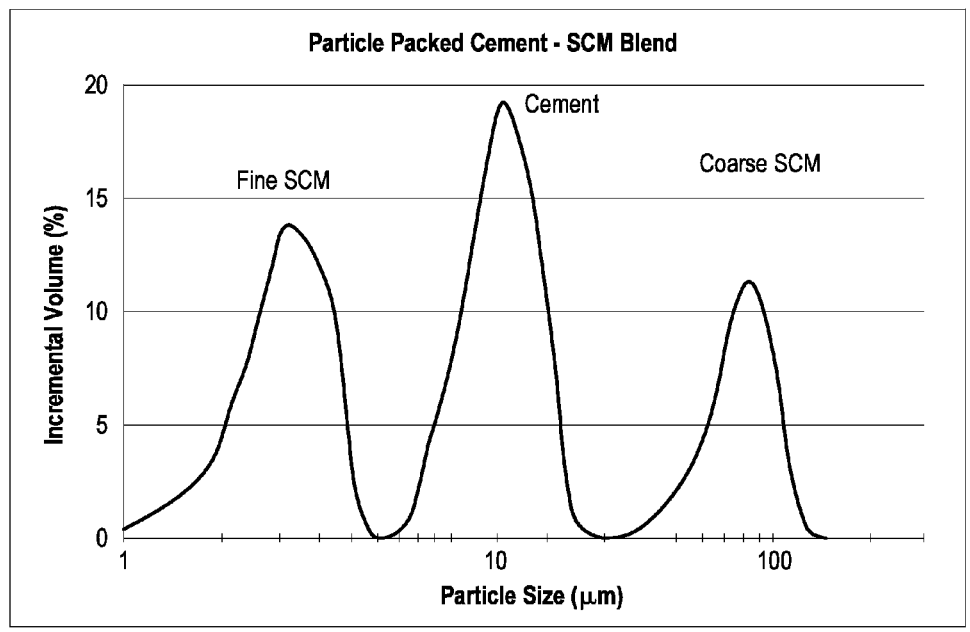

In contrast, the PSDs of the example particle packed cement-SCM blends illustrated in FIGS. 3A-3E have little or no overlap and/or have larger separations between the MPS of each adjacent fraction. FIG. 3A schematically illustrates an example ternary blend in which there is minimal overlap between the fine SCM and cement fractions and the cement and coarse SCM fractions, and no overlap between the fine and coarse SCM fractions. In addition, the MPS multiple between adjacent fractions is 3.0 times or greater. FIG. 3B schematically illustrates another example ternary blend in which there is virtually no overlap between adjacent fractions and the MPS multiple between adjacent fractions is 3.0 times or greater. FIG. 3C schematically illustrates another example ternary blend in which there is no overlap between adjacent fractions and even a gap between the smallest particles of the coarse SCM and the largest particles of the cement. The MPS multiple between adjacent fractions is even greater.

Figure 3D:
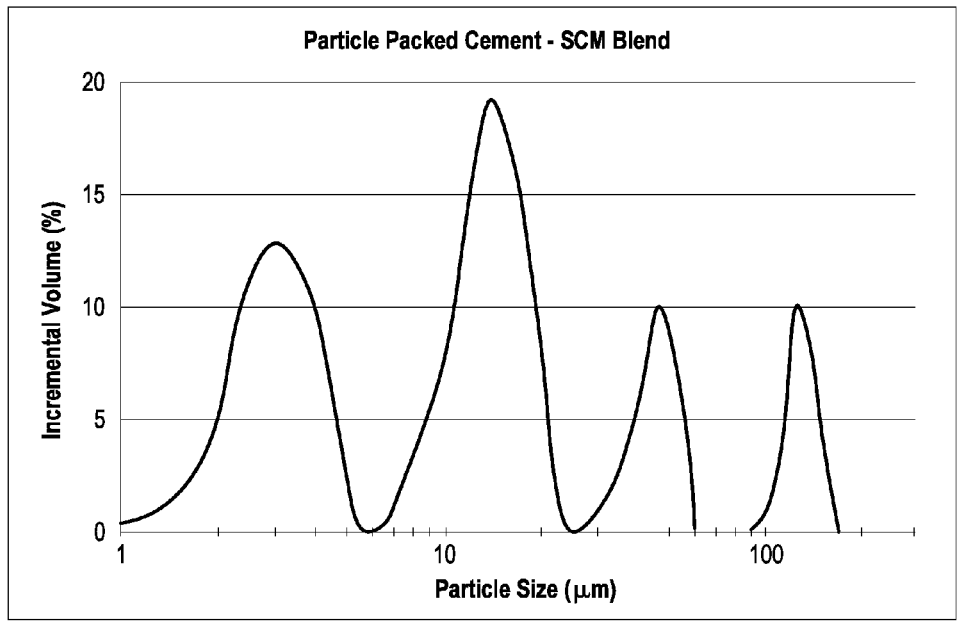
Figure 3E:
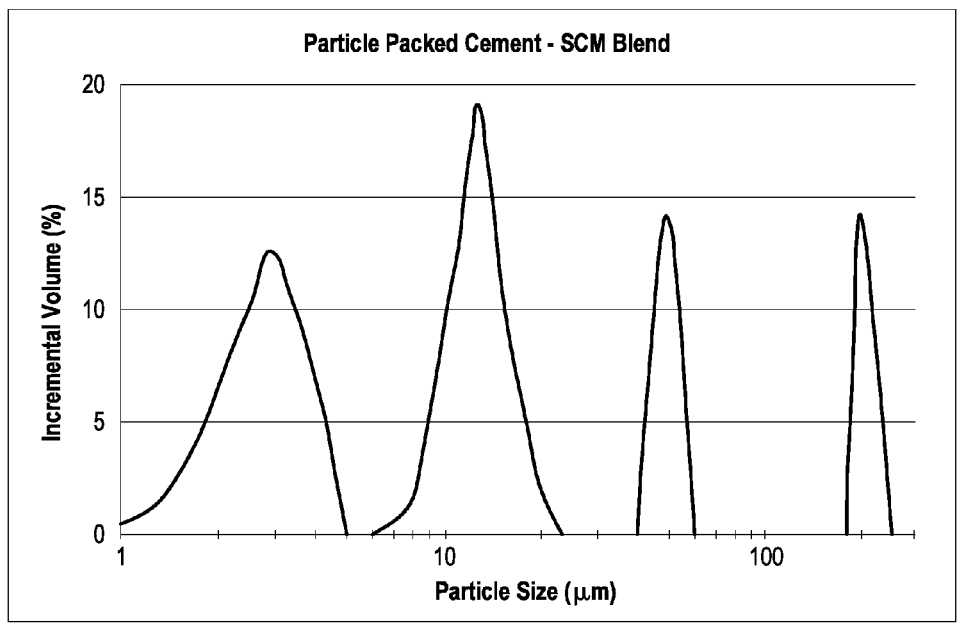

FIG. 3D schematically illustrates an example quaternary blend in which there is no overlap between adjacent fractions and a gap between first and second coarse SCM fractions. The MPS multiple between adjacent fractions is 3.0 or greater. FIG. 3E schematically illustrates another example quaternary blend in which there are gaps between all adjacent fractions and the MPS multiple between adjacent fractions is even greater.

In one embodiment, a particle packed binary cement-SCM blend includes a narrow PSD cement as described herein and a single SCM fraction having a mean particle size (MPS) (e.g., d50) that differs from the MPS (e.g., d50) of the narrow PSD cement fraction by a multiple of at least 3.0, 3.25, 3.5, 3.75, 4, 4.25, 4.5, 5, 5.5 or 6 (e.g., a multiple ranging from 3.0-10, 3.25-8 or 3.5-6). In one embodiment, the single SCM fraction comprises a coarse SCM fraction with an MPS at least 3.0 times, 3.25 times, 3.5 times, 3.75 times, 4 times, 4.25 times, 4.5 times, 5 times, 5.5 times or 6 times the MPS of the narrow PSD cement. In another embodiment, the single SCM fraction comprises a fine SCM such that the MPS of the narrow PSD cement is at least 3.0 times, 3.25 times, 3.5 times, 3.75 times, 4 times, 4.25 times, 4.5 times, 5 times, 5.5 times or 6 times the MPS of the single SCM fraction. In some embodiments, there may be no overlap in the PSDs of the cement and SCM fractions. Some overlap may be permitted so long as the MPS of the cement and SCM fractions are sufficiently different so that the overall blend has a high PPD (e.g., at least 57.0%). Particle packed binary cement-SCM blends may be suitable for use by themselves or may require or benefit from blending with one or more additional SCMs to form a ternary or quaternary blend.

In another embodiment, a ternary cement-SCM blend includes narrow PSD cement and first and second SCM fractions. The first SCM fraction can be a coarse SCM having an MPS (e.g., d50) that is at least 3.0 times, 3.25 times, 3.5 times, 3.75 times, 4 times, 4.25 times, 4.5 times, 5 times, 5.5 times, or 6 times (e.g., ranging from 3.0-10, 3.25-8 or 3.5-6 times) the MPS (e.g., d50) of the narrow PSD cement. The second SCM fraction can be a fine SCM such that the MPS of the narrow PSD cement is at least 3.0 times, 3.25 times, 3.5 times, 3.75 times, 4 times, 4.25 times, 4.5 times, 5 times, 5.5 times or 6 times the MPS of the second SCM fraction. In one embodiment, only one of the SCM fractions is "particle-packed" relative to the cement fraction (i.e., the MPSs differ by a multiple of at least 3.0) while the other SCM fraction is merely "gap-graded" (i.e., the MPSs differ by a multiple of less than 3.0). This is permissible so long as the blend has high PPD (i.e., at least 57.0).

In yet another embodiment, a quaternary cement-SCM blend may include a third SCM fraction that differs from the first and second SCM fractions. The third SCM fraction can simply be a different type of SCM with similar or overlapping PSD as the coarse SCM fraction and/or it may provide a fourth PSD that further enhances particle packing of the overall blend. For example, the first and second SCM fractions may comprise one or more types of pozzolan (e.g., fly ash, natural pozzolan, or slag), and the third SCM fraction may comprise a non-pozzolanic material (e.g., ground limestone or siliceous mineral). Alternatively, one or both of the first and second SCM fractions may comprise non-pozzolanic material(s) and the third SCM fraction may comprise pozzolan. In one embodiment, the MPS of the third SCM fraction (e.g., ultra-coarse SCM fraction) can be at least 3.0 times the MPS of the coarse SCM fraction. In yet another embodiment, the MPS of the third SCM fraction can be less than 3.0 times the MPS of the coarse SCM fraction.

E. Example Manufacturing Systems

FIGS. 4A through 7E illustrate examples of manufacturing systems for manufacturing a narrow PSD cement and/or one or more SCM fractions having a desired PSD. Grinding apparatus and classifiers known in the art or modified to produce narrow PSD cement and particle packed cement-SCM blends may be used, e.g., ball mills, high pressure grinding rolls, vertical roller mills, rod mills, jet mills, hammer mills, high efficiency classifiers, sieves, and the like. Exemplary grinding and separation equipment is available from one or more of FLSmidth, Polysius or Pfeiffer. In general, using more classifiers permits steeper particle size cutoffs and facilitates production of more precise PSDs for the cement and/or SCM fractions. In the event a reference number is not explicitly described it shall be understood as being the same as a similar reference number that is described in a different Figure.

Figure 4A:
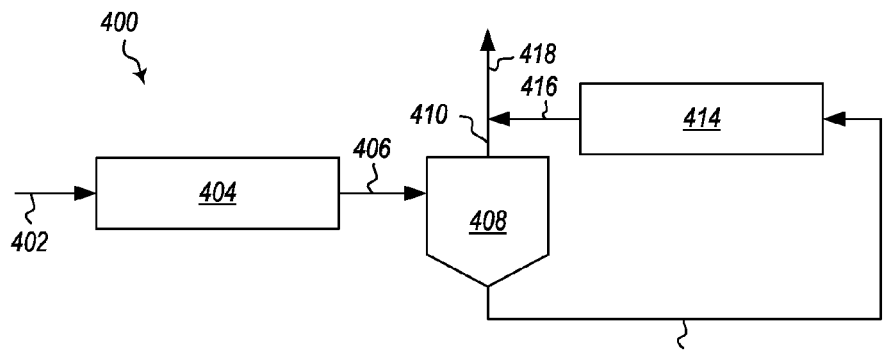

FIG. 4A illustrates a manufacturing system 400 for processing material 402 and includes first mill 404 to produce first ground material 406, which is sent to separator 408 to produce fine fraction 410 and coarse fraction 412, which is reground in second mill 414. Reground material 416 is combined with fine fraction 410 to yield product 418.

Figure 4B:
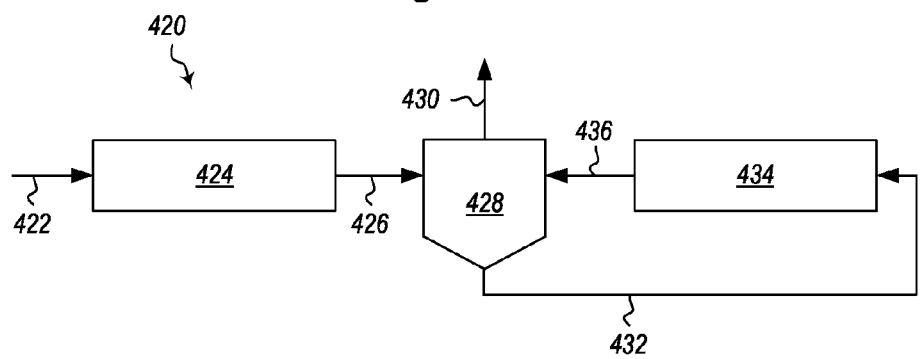

FIG. 4B illustrates a manufacturing system 420 for processing material 422 and includes first mill 424 to produce first ground material 426, which is sent to separator 428 to produce product 430 and coarse fraction 432, which is reground in second mill 434. Reground material 436 is introduced into separator 428 and contributes to final product 430.

Figure 4C:
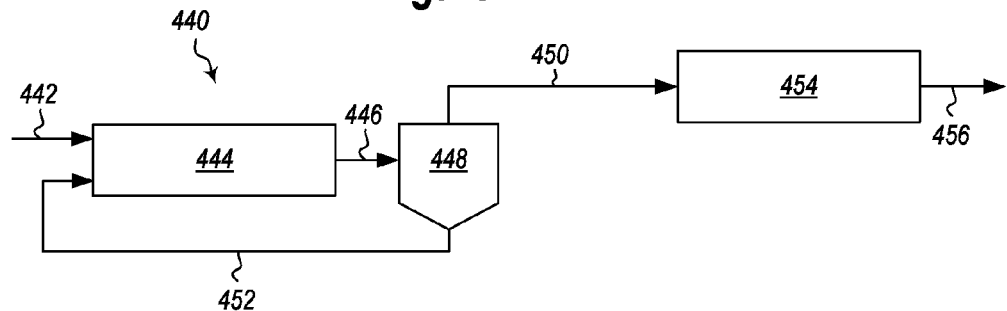

FIG. 4C illustrates a manufacturing system 440 for processing material 442 includes first mill 424 to produce ground material 446, which is sent to separator 448. Coarse material 452 is recycled back to first mill 444 to form a coarse grinding circuit. Fine material 450 is reground in second mill 454 to yield product 456.

Figure 4D:
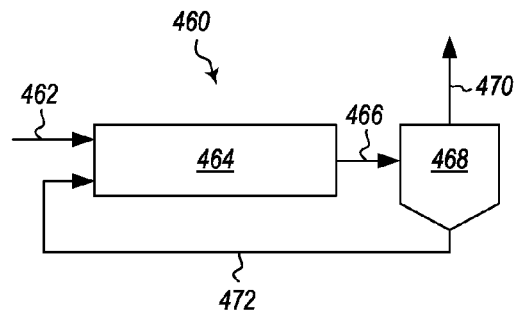

FIG. 4D illustrates a manufacturing system 460 for processing material 462 that includes single mill 464, which yields ground material 466, and single separator 468, which produces product stream 470 and a coarse fraction 472, which is returned to mill 464.

Figure 5A:
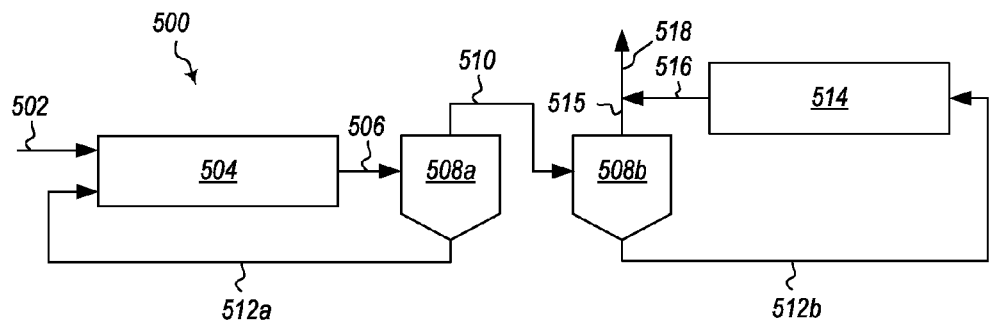
FIGS. 5A-5D schematically illustrate example two classifier milling and classification systems for manufacturing a narrow PSD hydraulic cement.

FIG. 5A illustrates a manufacturing system 500 for processing material 502 that includes a coarse grinding circuit consisting of coarse mill 504 that produces ground material 506 and first separator 508a, which produces first coarse fraction 512a, which is returned to coarse mill 504 for regrinding, and a first fine fraction 510, which is fed into second separator 508b. Second separator 508b produces fine fraction 515 and coarse fraction 512b, which is fed into fine mill 514 to produce reground material 516, which is combined with fine fraction 515 to yield product 518.

Figure 5B:
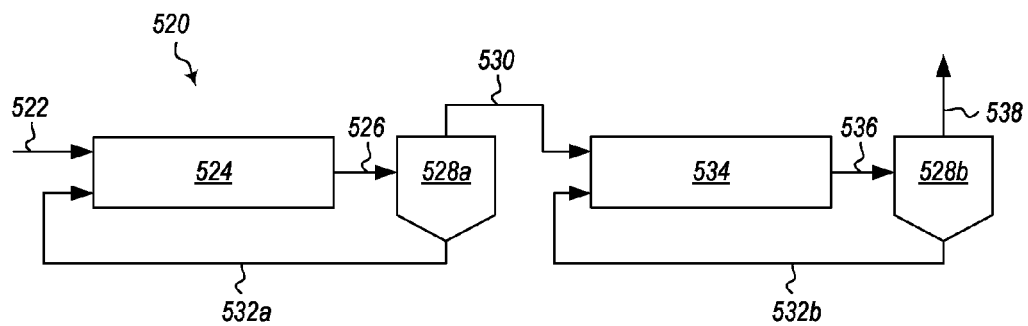

FIG. 5B illustrates a manufacturing system 520 which differs from system 500 in that it includes separate coarse and fine grinding circuits for processing material 522. The coarse grinding circuit includes coarse mill 524 that produces first ground material 526, first separator 528a that produces finer fraction 530 and coarser fraction 532a, which is recycled back to coarse mill 524. The fine grinding circuit includes fine mill 534 that produces reground material 536, second classifier 528b that produces product 538, and second coarse fraction 532b, which is recycled back to fine mill 534.

Figure 5C:
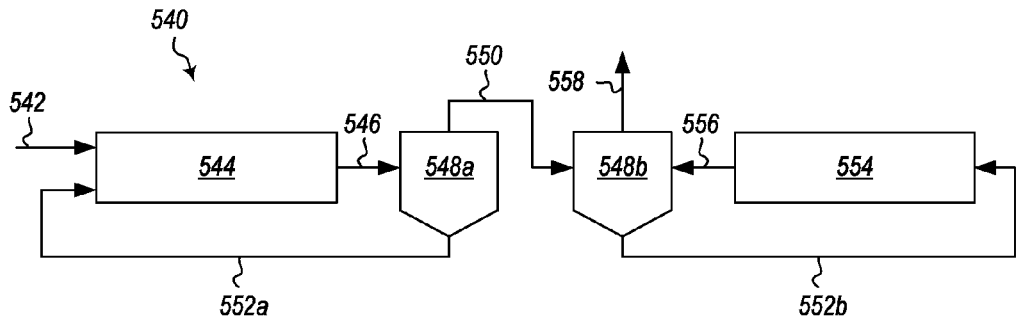

FIG. 5C illustrates system 540, which differs from system 520 of FIG. 5B in that second separator 548b is used to double classify initial ground material 546 and blend first fine material 550 and reground fine material 556 to yield product 558.

Figure 5D:
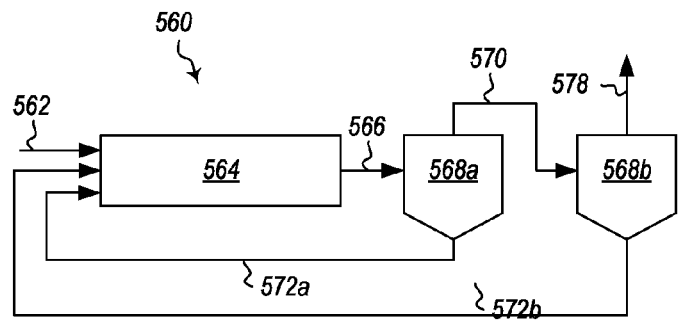

FIG. 5D illustrates system 560, which differs from systems 500, 520 and 540 by only including a single grinding apparatus 564 but two separation apparatus 568a and 568b (as may be integrated within a vertical roller mill with the initial separator around a perimeter of the grinding table and a single integrated high efficiency classifier). Coarse fractions 572a, 572b are reground by mill 564.

Figure 6A:
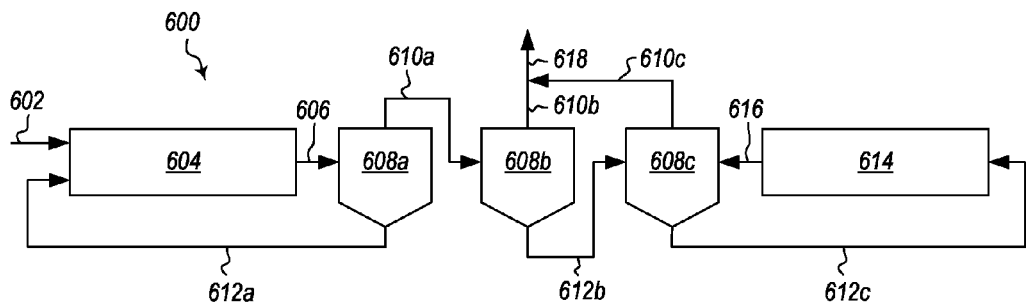
FIGS. 6A-6F schematically illustrate example three classifier milling and classification systems for manufacturing a narrow PSD hydraulic cement.
Figure 6B:
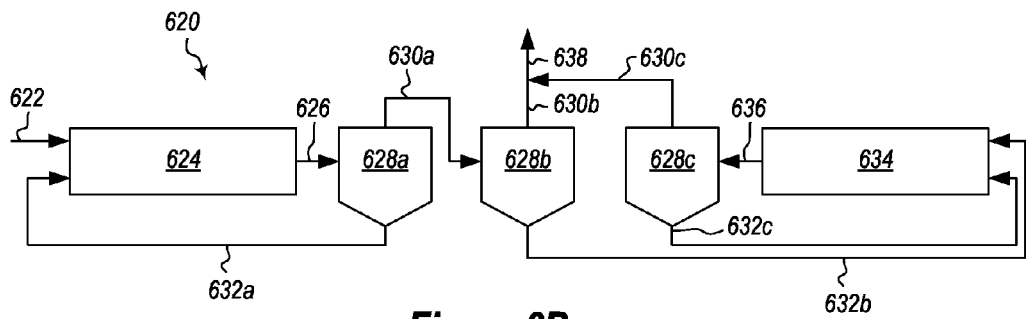

FIG. 6A illustrates a manufacturing system 600 for processing material 602 that includes a coarse grinding circuit consisting of coarse mill 604 and first separator 608a, which produces first coarse fraction 612a, recycled back into coarse mill 604 for regrinding and first fine fraction 610a, fed into second separator 608b. Second separator 608b produces second fine fraction 610b and second coarse fraction 612b, which is fed into third classifier 608c, part of a fine grinding circuit that includes fine mill 614. Reground material 616 from fine mill 614 is fed into third separator 608c, which produces third fine fraction 610c, which is combined with second fine fraction 610b to yield product 618. FIG. 6B illustrates system 620 that differs from system 600 in that the second course fraction 632b is fed into fine mill 634 rather than third classifier 628a.

Figure 6C:
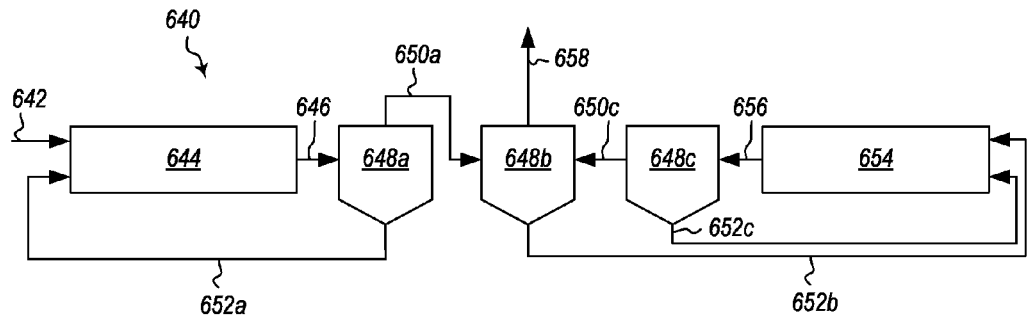
Figure 6D:
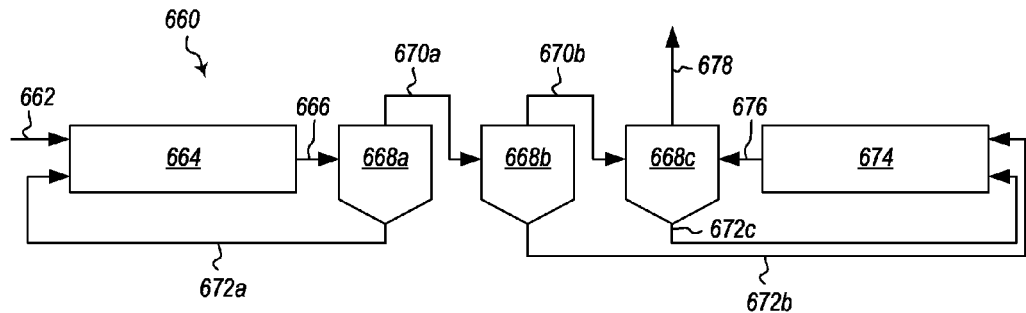
Figure 6E:
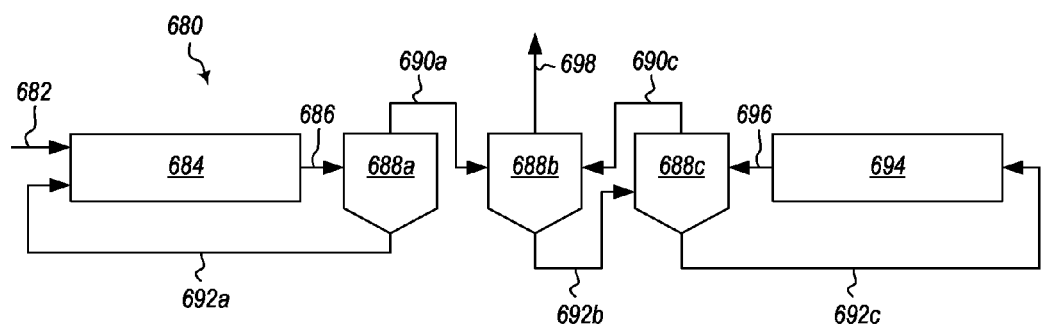
Figure 6F:
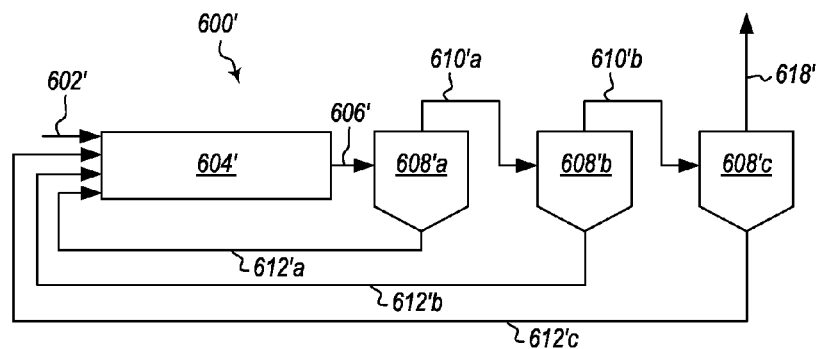

FIGS. 6C-6E illustrate manufacturing systems 640, 660, 680 which differ from systems 600, 620 in that the product is produced by blending products from the coarse and fine milling circuits in a single classifier. FIG. 6F illustrates manufacturing system 600' for processing material 602' which includes single grinding mill 604' coupled with three separators 608'a, 608'b, 608'c arranged in series to provide triple classification of ground material 606', with first, second and third coarse fractions 612'a, 612'b, and 612'c recycled back to mill 604'. For example, a VRM modified to include two high efficiency classifiers coupled with the initial separator around the perimeter of the grinding table can provide triple classification as shown in FIG. 6F.

Figure 7A:
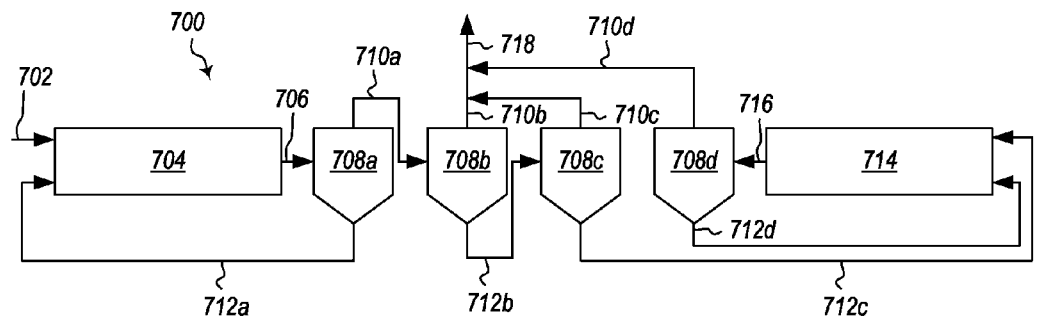
FIGS. 7A-7E schematically depict example four classifier milling and classification systems for manufacturing a narrow PSD hydraulic cement.

FIG. 7A illustrates a manufacturing system 700 for processing material 702 that includes a coarse grinding circuit consisting of coarse mill 704 and first classifier 708a, which produces first coarse fraction 712a, is recycled back to coarse mill 704, and first fine fraction 710a, fed into second classifier 708b. Second classifier 708b produces second fine 710b fraction and second coarse fraction 712b, fed into third classifier 708c to remove fines, which provide third fine fraction 710c, and yield third coarse fraction 712c, which is fed into fine mill 714 of a fine grinding circuit that includes fourth classifier 708d to classify reground material 716. Fourth fine fraction 710d is combined with second and third fine fractions 710b, 710c to yield product 718. Fourth coarse fraction 712d is recycled back into fine mill 714.

Figure 7B:
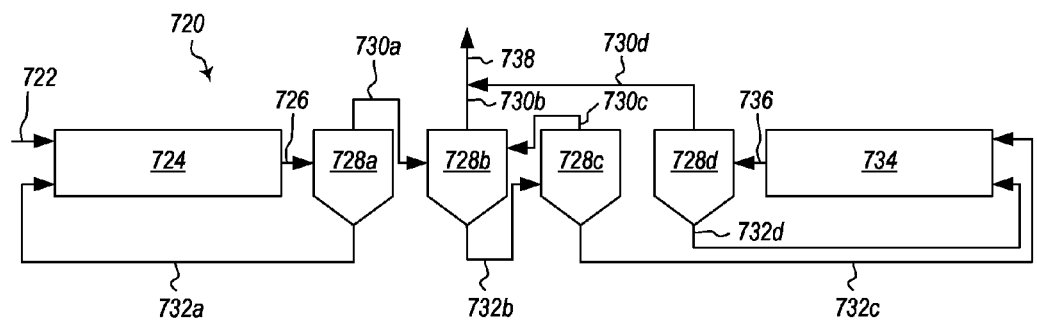
Figure 7C:
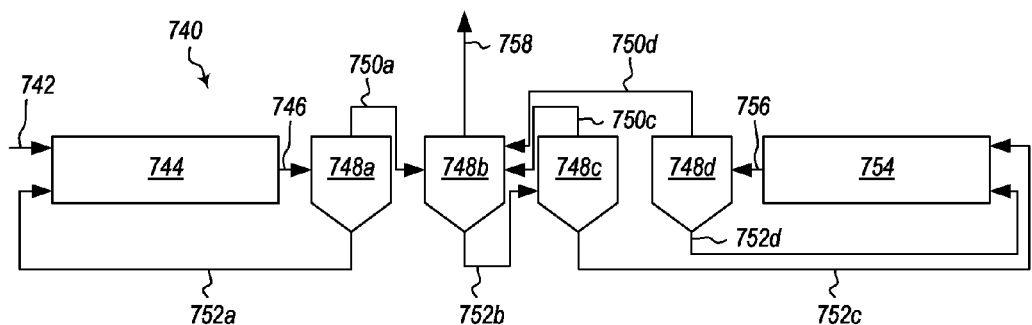
Figure 7D:
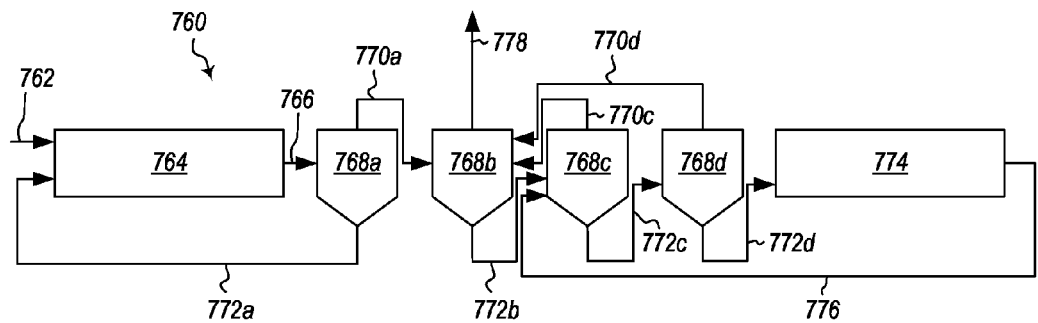

FIG. 7B illustrates a manufacturing system 720 that differs from system 700 in that third fine fraction 730c is fed into second classifier 728b for mixing with second fine fraction 730b to produce a stream that is blended with fourth fine fraction 730d to yield product 738. FIG. 7C illustrates system 740 that differs from systems 700 and 720 in that both third and fourth fine fractions 750c, 750d are fed into second classifier 748b for mixing with second fine fraction 750b to yield product 758. FIG. 7D illustrates 760 that provides double classification for both the coarse and fine grinding circuits and utilizes second classifier 768b to produce final product 778.

Figure 7E:
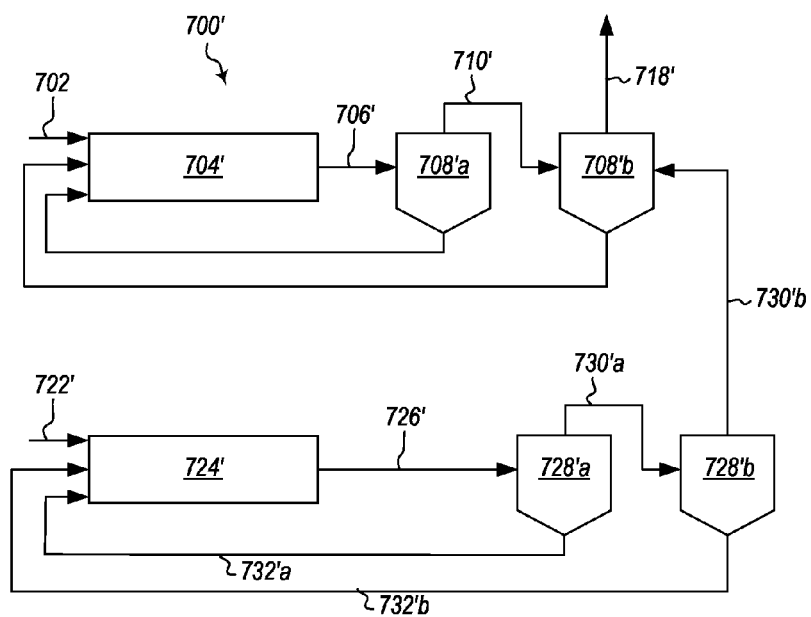

FIG. 7E illustrates system 700' for separately processing first material 702 and second material 702' and then combining the resultant materials to produce combined blended stream 718'. First material 702 is processed by first grinding apparatus 704' to produce first initial ground product 706', fed into serially arranged separators 708'a, 708'b, with first coarse fractions 712'a, 712'b being recycled back to first grinding apparatus 704'. Second material 702' is processed by second mill 724' to produce second initial ground product 726', which is fed into serially arranged separators 728'a, 728'b, with second coarse fractions 732'a, 732'b being recycled back to second grinding apparatus 724'. Second processed material 730'b is fed into classifier 708'b and combined with a first processed material to yield final blended product 718'.

According to one embodiment, a VRM or high pressure grinding roll is used to make the narrow PSD cement and/or one or more SCM fractions. Such mills may include a grinding bed and one or more high efficiency classifiers in series. A roller mill is configured to have a comminution profile, material residence time, and classifier efficiency to produce narrow PSD cement. The roller mill has components and operating parameters selected to produce narrow PSD cement with minimal ultrafine particles and substantially fewer coarse particles as compared to conventional OPC. By way of example, components and operating parameters of a VRM selected to produce narrow PSD cement include one or more of dam ring height, mass air flow, inner recirculation rate, outer recirculation rate, air velocity and/or volume, classifier cut point, classifier capacity, classifier separation efficiency, grinding bed pressure, roller width, roller diameter, roller spacing, table speed, table geometry, roller geometry, material feed rate, grinding aid, and the like.

IV. Cementitious Products Made Using Cement-SCM Blends

Particle packed cement-SCM blends can be used in place of OPC, site blends of OPC and SCM, interground blends, and other cements known in the art. They can be used as sole or supplemental binder to make concrete, ready mix concrete, bagged concrete, bagged cement, mortar, bagged mortar, grout, bagged grout, molding compositions, or other fresh or dry cementitious compositions known in the art. Particle packed cement-SCM blends can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to cementitious compositions continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

Water is both a reactant and rheology modifier that permits a fresh cementitious composition to flow or be molded into a desired configuration. Hydraulic cement reacts with water, binds the other solid components together, and is most responsible for early strength development and can contribute to later strength development. Blends with high PPD have reduced void space, which reduces water demand and increases workability for a given quantity of water.

V. EXAMPLES

The examples in WO 2011130482 are modified to yield cement-SCM blends in which at least one SCM fraction and the narrow PSD cement fraction have MPSs that differ by a multiple of 3.0, 3.05, 3.1, 3.15, 3.2, 3.25, 3.3, 3.4, 3.5, 3.75, 4, 4.25, 4.5, 5, 5.5, 6, 6.5, 7, 7.5, 8, 8.5, 9, 9.5 or 10 to yield a cement-SCM blend having a PPD of 57.0, 57.5%, 58%, 58.5, 59%, 59.5, 60%, 60.5%, 61%, 61.5%, 62%, 62.5%, 63%, 64%, 65%, 66%, 67.5%, 70%, 72.5%, 75%, 80%, 85%, or 90%.

Example 1

A cement-SCM blend is prepared having the following components:

| Component | D10 | D50 | D90 | Amount (wt %) |
|---|---|---|---|---|
| Portland cement | 10 μm | 15 μm | 20 μm | 33% |
| Limestone | 1 μm | 5 μm | 10 μm | 33% |
| Fly Ash (F) | 20 μm | 45 μm | 60 μm | 33% |

The PPD of the foregoing blend is greater than 57.0 (i.e., 60 or greater).

Example 2

A cement-SCM blend is prepared having the following components:

| Component | D10 | D50 | D90 | Amount (wt %) |
|---|---|---|---|---|
| Portland cement | 5 μm | 12 μm | 18 μm | 45% |
| Silica Fume | 0.1 μm | 0.5 μm | 1 μm | 5% |
| Fly Ash (F) | 5 μm | 25 μm | 60 μm | 50% |

The PPD of the foregoing blend is greater than 57.0 (i.e., 60 or greater).

Example 3

A cement-SCM blend is prepared having the following components:

| Component | D10 | D50 | D90 | Amount (wt %) |
|---|---|---|---|---|
| Portland cement | 8 μm | 16 μm | 24 μm | 45% |
| Limestone | 0.1 μm | 0.5 μm | 1.5 μm | 10% |
| GGBFS | 15 μm | 25 μm | 40 μm | 25% |
| Limestone | 50 μm | 100 μm | 200 μm | 20% |

The PPD of the foregoing blend is greater than 57.0 (i.e., 65 or greater).

Example 4

A cement-SCM blend is prepared having the following components:

| Component | D10 | D50 | D90 | Amount (wt %) |
|---|---|---|---|---|
| Portland cement | 10 μm | 18 μm | 30 μm | 30% |
| GGBFS | 1 μm | 4 μm | 10 μm | 20% |
| Fly Ash | 5 μm | 22 μm | 60 μm | 25% |
| Limestone | 50 μm | 100 μm | 200 μm | 25% |

The PPD of the foregoing blend is greater than 57.0 (i.e., 65 or greater).

Any of Examples 2-4 is modified to create separation between the d99 of a smaller fraction and the d1 of the next larger fraction to further increase PPD.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A cement-SCM blend comprising:
a hydraulic cement fraction having a median particle size; and
at least one supplementary cementitious material (SCM) fraction having a median particle size that differs from the median particle size of the hydraulic cement fraction in order for the cement-SCM blend, when initially mixed with water, to form a cement paste having a maximum particle packing density of at least 57.0%.

2. A cement-SCM blend as in claim 1, wherein the cement-SCM blend, when initially mixed with water, forms a cement paste having a maximum particle packing density of at least about 60%.

3. A cement-SCM blend as in claim 1, wherein the cement-SCM blend, when initially mixed with water, forms a cement paste having a maximum particle packing density of at least about 62.5%.

4. A cement-SCM blend as in claim 1, wherein the cement-SCM blend, when initially mixed with water, forms a cement paste having a maximum particle packing density of at least about 65%.

5. A cement-SCM blend as in claim 1, wherein the cement-SCM blend, when initially mixed with water, forms a cement paste having a maximum particle packing density of at least about 70%.

6. A cement-SCM blend as in claim 1, wherein the cement-SCM blend comprises a fine SCM fraction having a median particle size and a coarse SCM fraction having a median particle size and that is processed separately from the fine SCM fraction, the median particle size of the coarse SCM fraction being at least about 3 times the median particle size of the hydraulic cement fraction and/or the median particle size of the hydraulic cement fraction being at least about 3 times the median particle size of the fine SCM fraction.

7. A cement-SCM blend as in claim 6, wherein the median particle size of the hydraulic cement fraction is at least about 3.5 times the median particle size of the fine SCM fraction and/or the median particle size of the second SCM fraction is at least 3.5 times the median particle size of the hydraulic cement fraction.

8. A cement-SCM blend as in claim 6, wherein the median particle size of the hydraulic cement fraction is at least about 4 times the median particle size of the fine SCM fraction and/or the median particle size of the second SCM fraction is at least 4 times the median particle size of the hydraulic cement fraction.

9. A cement-SCM blend as in claim 6, wherein the cement-SCM blend further comprises a third SCM fraction having a median particle size that is at least about 3 times the median particle size of the second SCM fraction.

10. A cement-SCM blend as in claim 1, wherein the hydraulic cement and the at least one SCM fraction are processed and blended without intergrinding.

11. A cement-SCM blend as in claim 1, wherein:
the hydraulic cement fraction has a d85 in a range of about 8 μm to about 35 μm and a d15 in a range of about 1.0 μm to about 15 μm;
the at least one SCM fraction includes a coarse SCM having a d85 in a range of about 30 μm to about 300 μm.

12. A cement-SCM blend as in claim 11, wherein the at least one SCM fraction further includes a fine SCM fraction processed separately from the coarse SCM and having a d85 in a range of about 1 μm to about 18 μm.

13. A cement-SCM blend as in claim 11, wherein the coarse SCM fraction has a d15 in a range of about 8 μm to about 50 μm.

14. A cement-SCM blend as in claim 11, wherein the at least one SCM fraction further includes a second coarse SCM fraction processed separately from the coarse SCM fraction and having a median particle size greater than the median particle size of the coarse SCM fraction.

15. A cementitious composition comprising mixture products of:
a hydraulic cement fraction having a median particle size;
at least one supplementary cementitious material (SCM) fraction having a median particle size that differs from the median particle size of the hydraulic cement fraction in order for the cement-SCM blend, when initially mixed with water, to form a cement paste having a maximum particle packing density of at least 57.0%; and at least one of fine aggregate, coarse aggregate, water, or chemical admixture.

16. A cementitious composition as in claim 15, wherein the cementitious composition comprises freshly mixed or hardened concrete made using water.

17. A cementitious composition as in claim 15, wherein the cementitious composition comprises a dry blend comprising the hydraulic cement, the at least one SCM fraction, a fine aggregate, and optionally a coarse aggregate.

18. A method of manufacturing a cement-SCM blend comprising:

providing a hydraulic cement characterized by a median particle size;

blending the hydraulic cement with at least one supplementary cementitious material (SCM) having a median particle size that differs from the median particle size of the hydraulic cement in order for the cement-SCM blend, when initially mixed with water, to form a cement paste having a maximum particle packing density of at least 57.0%.

19. A method as in claim 11, wherein the hydraulic cement is processed using at least one of a vertical roller mill, high pressure grinding roll, or ball mill.

20. A method as in claim 18, further comprising blending at least one of a fine aggregate, coarse aggregate, water, or chemical admixture with the hydraulic cement and the at least one SCM.

* * * * *